United States Patent [19]

Ackerman et al.

[11] Patent Number: 4,623,147

[45] Date of Patent: Nov. 18, 1986

[54] PROCESS FOR DISPLAYING A PLURALITY OF OBJECTS ON A VIDEO SCREEN

[75] Inventors: Mark S. Ackerman, Belmont; Glenn Parker, Watertown, both of Mass.

[73] Assignee: General Computer Company, Cambridge, Mass.

[21] Appl. No.: 533,863

[22] Filed: Sep. 20, 1983

[51] Int. Cl.[4] .......................................... G06F 3/153
[52] U.S. Cl. ........................... 273/1 E; 273/DIG. 28; 340/725
[58] Field of Search ........... 273/1 E, 1 GC, DIG. 28, 273/85 G; 340/724, 725, 748, 750, 733; 315/377; 358/142

[56] References Cited

U.S. PATENT DOCUMENTS

| | | |
|---|---|---|
| 3,793,483 | 2/1974 | Bushnell . |
| 4,016,362 | 4/1977 | Bristow et al. ............. 273/DIG. 28 |
| 4,045,769 | 8/1977 | Bristow . |
| 4,112,422 | 9/1978 | Mayer et al. . |
| 4,116,444 | 9/1978 | Mayer et al. . |
| 4,119,955 | 10/1978 | Nichols, III ................ 273/DIG. 28 |
| 4,246,578 | 1/1981 | Kawasaki et al. .................. 340/724 |
| 4,247,853 | 1/1981 | Hamilton et al. ................... 340/724 |
| 4,296,476 | 10/1981 | Mayer et al. ............... 273/DIG. 28 |
| 4,324,401 | 4/1982 | Stubben et al. . |
| 4,471,464 | 9/1984 | Mayer et al. ......................... 340/725 |

OTHER PUBLICATIONS

Brody, Video Games Enter Technology Time Warp, High Technology, Jun. 1983, pp. 36-46.
Perry and Wallich, Design Case History: The Atari Video Computer System, IEEE Spectrum, Mar. 1983, pp. 45-51.

Primary Examiner—Richard C. Pinkham
Assistant Examiner—MaryAnn Stoll Lastova
Attorney, Agent, or Firm—Hosier & Sufrin, Ltd.

[57] ABSTRACT

A process is disclosed for displaying a plurality of objects on a video display screen. A video computer system (VCS) includes a microprocessor unit (MPU), a television interface adapter (TIA) having first and second high-resolution player graphics capabilities, a video display screen in the form of a television set, operator controls, and a video game cartridge in the form of read-only memory (ROM) which contains digital program information including the steps of the present process stored in preselected address locations. The present process uses a first set of data for a high-resolution player graphics original and multiple resets of an associated player graphics register to display greater than three copies of the player graphics original on a single given horizontal scan line of the video display screen. As a result, the remaining high-resolution player graphics original is available to create other high-resolution player graphics copies on the same series of horizontal scan lines. The copies of the player graphics original can be selectively removed from the video display screen. A second embodiment of the present invention includes a process for using sets of data for the two high-resolution player graphics originals and multiple resets of respective associated player graphics registers to create greater than two graphically different high-resolution player graphics copies along a single given series of horizontal scan lines.

9 Claims, 29 Drawing Figures

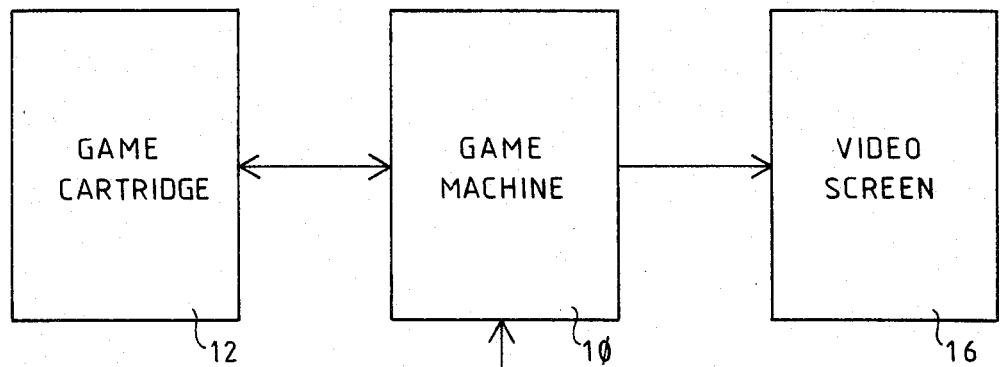
FIG.1
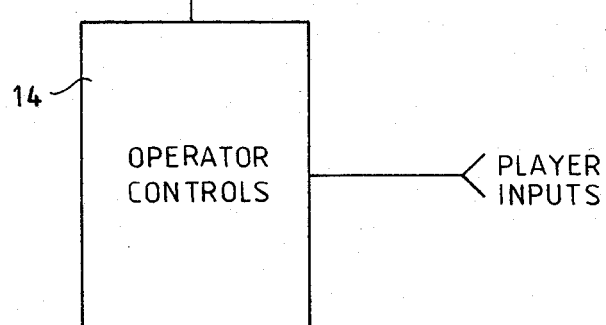
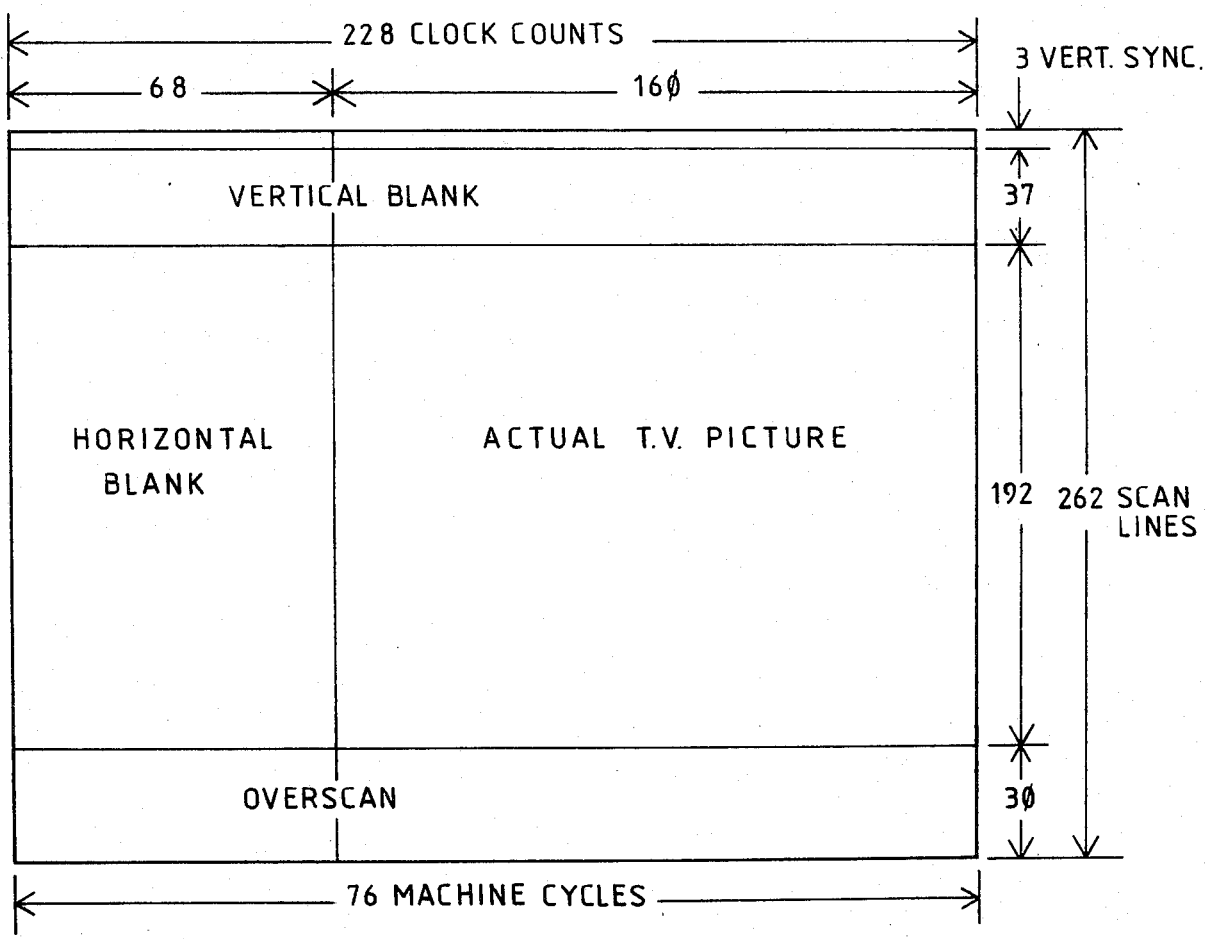
FIG.3

FIG. 4A

| ADDRESS DEC | ADDRESS HEX | ADDRESS NAME | 7 | 6 | 5 | 4 | 3 | 2 | 1 | 0 | FUNCTION |
|---|---|---|---|---|---|---|---|---|---|---|---|
| 00 | 00 | VSYNC | | | | | | | 1 | | VERTICAL SYNC SET-CLEAR |
| 01 | 01 | VBLANK | 1 | 1 | | | | | 1 | | VERTICAL BLANK SET-CLEAR |
| 02 | 02 | WSYNC | STROBE | | | | | | | | WAIT FOR LEADING EDGE OF HORIZONTAL BLANK |
| 03 | 03 | RSYNC | STROBE | | | | | | | | RESET HORIZONTAL SYNC COUNTER |
| 04 | 04 | NUSIZ 0 | | | 1 | 1 | | 1 | 1 | 1 | NUMBER-SIZE PLAYER-MISSILE 0 |
| 05 | 05 | NUSIZ 1 | | | 1 | 1 | | 1 | 1 | 1 | NUMBER-SIZE PLAYER-MISSILE 1 |
| 06 | 06 | COLUP0 | 1 | 1 | 1 | 1 | 1 | 1 | 1 | | COLOR-LUM PLAYER 0 |
| 07 | 07 | COLUP1 | 1 | 1 | 1 | 1 | 1 | 1 | 1 | | COLOR-LUM PLAYER 1 |
| 10 | 08 | COLUPF | 1 | 1 | 1 | 1 | 1 | 1 | 1 | | COLOR-LUM PLAYFIELD |
| 11 | 09 | COLUBK | 1 | 1 | 1 | 1 | 1 | 1 | 1 | | COLOR-LUM BACKGROUND |
| 12 | 0A | CTRLPF | | | 1 | 1 | | 1 | 1 | 1 | CONTROL PLAYFIELD BALL SIZE AND COLLISIONS |
| 13 | 0B | REFP0 | | | | | 1 | | | | REFLECT PLAYER 0 |
| 14 | 0C | REFP1 | | | | | 1 | | | | REFLECT PLAYER 1 |
| 15 | 0D | PF0 | 1 | 1 | 1 | 1 | | | | | PLAYFIELD REG. BYTE 0 |
| 16 | 0E | PF1 | 1 | 1 | 1 | 1 | 1 | 1 | 1 | 1 | PLAYFIELD REG. BYTE 1 |
| 17 | 0F | PF2 | 1 | 1 | 1 | 1 | 1 | 1 | 1 | 1 | PLAYFIELD REG. BYTE 2 |
| 20 | 10 | RESP0 | STROBE | | | | | | | | RESET PLAYER 0 |
| 21 | 11 | RESP1 | STROBE | | | | | | | | RESET PLAYER 1 |
| 22 | 12 | RESM0 | STROBE | | | | | | | | RESET MISSILE 0 |
| 23 | 13 | RESM1 | STROBE | | | | | | | | RESET MISSILE 1 |
| 24 | 14 | RESBL | STROBE | | | | | | | | RESET BALL |
| 25 | 15 | AUDC0 | | | | | 1 | 1 | 1 | 1 | AUDIO CONTROL 0 |
| 26 | 16 | AUDC1 | | | | | 1 | 1 | 1 | 1 | AUDIO CONTROL 1 |

FIG. 4B

| ADDRESS DEC | ADDRESS HEX | ADDRESS NAME | DATA BITS USED 7 | 6 | 5 | 4 | 3 | 2 | 1 | 0 | FUNCTION |
|---|---|---|---|---|---|---|---|---|---|---|---|
| 27 | 17 | AUDF0 | | | | 1 | 1 | 1 | 1 | 1 | AUDIO FREQUENCY 0 |
| 30 | 18 | AUDF1 | | | | 1 | 1 | 1 | 1 | 1 | AUDIO FREQUENCY 1 |
| 31 | 19 | AUDV0 | | | | | 1 | 1 | 1 | 1 | AUDIO VOLUME 0 |
| 32 | 1A | AUDV1 | | | | | 1 | 1 | 1 | 1 | AUDIO VOLUME 1 |
| 33 | 1B | GRP0 | 1 | 1 | 1 | 1 | 1 | 1 | 1 | 1 | GRAPHICS PLAYER 0 |
| 34 | 1C | GRP1 | 1 | 1 | 1 | 1 | 1 | 1 | 1 | 1 | GRAPHICS PLAYER 1 |
| 35 | 1D | ENAM0 | | | | | | | 1 | | GRAPHICS (ENABLE) MISSILE 0 |
| 36 | 1E | ENAM1 | | | | | | | 1 | | GRAPHICS (ENABLE) MISSILE 1 |
| 37 | 1F | ENABL | | | | | | | 1 | | GRAPHICS (ENABLE) BALL |
| 40 | 20 | HMP0 | 1 | 1 | 1 | 1 | | | | | HORIZONTAL MOTION PLAYER 0 |
| 41 | 21 | HMP1 | 1 | 1 | 1 | 1 | | | | | HORIZONTAL MOTION PLAYER 1 |
| 42 | 22 | HMM0 | 1 | 1 | 1 | 1 | | | | | HORIZONTAL MOTION MISSILE 0 |
| 43 | 23 | HMM1 | 1 | 1 | 1 | 1 | | | | | HORIZONTAL MOTION MISSILE 1 |
| 44 | 24 | HMBL | 1 | 1 | 1 | 1 | | | | | HORIZONTAL MOTION BALL |
| 45 | 25 | VDELP0 | | | | | | | | 1 | VERTICAL DELAY PLAYER 0 |
| 46 | 26 | VDELP1 | | | | | | | | 1 | VERTICAL DELAY PLAYER 1 |
| 47 | 27 | VDELBL | | | | | | | | 1 | VERTICAL DELAY BALL |
| 50 | 28 | RESMP0 | | | | | | 1 | | | RESET MISSILE 0 TO PLAYER 0 |
| 51 | 29 | RESMP1 | | | | | | 1 | | | RESET MISSILE 1 TO PLAYER 1 |
| 52 | 2A | HMOVE | STROBE | | | | | | | | APPLY HORIZONTAL MOTION |
| 53 | 2B | HMCLR | STROBE | | | | | | | | CLEAR HORIZ. MOTION REGISTER |
| 54 | 2C | CXCLR | STROBE | | | | | | | | CLEAR COLLISION LATCHES |

FIG.4C

| ADDRESS DEC | ADDRESS HEX | ADDRESS NAME | DATA BITS USED 7 | 6 | 5 | 4 | 3 | 2 | 1 | 0 | FUNCTION | D7 | D6 |
|---|---|---|---|---|---|---|---|---|---|---|---|---|---|
| 00 | 00 | CXM0P | 1 | 1 | | | | | | | READ COLLISION | M0·P1 | M0·P0 |
| 01 | 01 | CXM1P | 1 | 1 | | | | | | | " | M1·P0 | M1·P1 |
| 02 | 02 | CXP0FB | 1 | 1 | | | | | | | " | P0·PF | P0·BL |
| 03 | 03 | CXP1FB | 1 | 1 | | | | | | | " | P1·PF | P1·BL |
| 04 | 04 | CXM0FB | 1 | 1 | | | | | | | " | M0·PF | M0·BL |
| 05 | 05 | CXM1FB | 1 | 1 | | | | | | | " | M1·PF | M1·BL |
| 06 | 06 | CXBLPF | 1 | | | | | | | | " | BL·PF | ✗ |
| 07 | 07 | CXPPMM | 1 | 1 | | | | | | | " | P0·P1 | M0·M1 |
| 10 | 08 | INPT0 | 1 | | | | | | | | READ POT PORT | 10 | |
| 11 | 09 | INPT1 | 1 | | | | | | | | READ POT PORT | 11 | |
| 12 | 0A | INPT2 | 1 | | | | | | | | READ POT PORT | 12 | |
| 13 | 0B | INPT3 | 1 | | | | | | | | READ POT PORT | 13 | |
| 14 | 0C | INPT4 | 1 | | | | | | | | READ INPUT | 14 | |
| 15 | 0D | INPT5 | 1 | | | | | | | | READ INPUT | 15 | |

FIG. 5

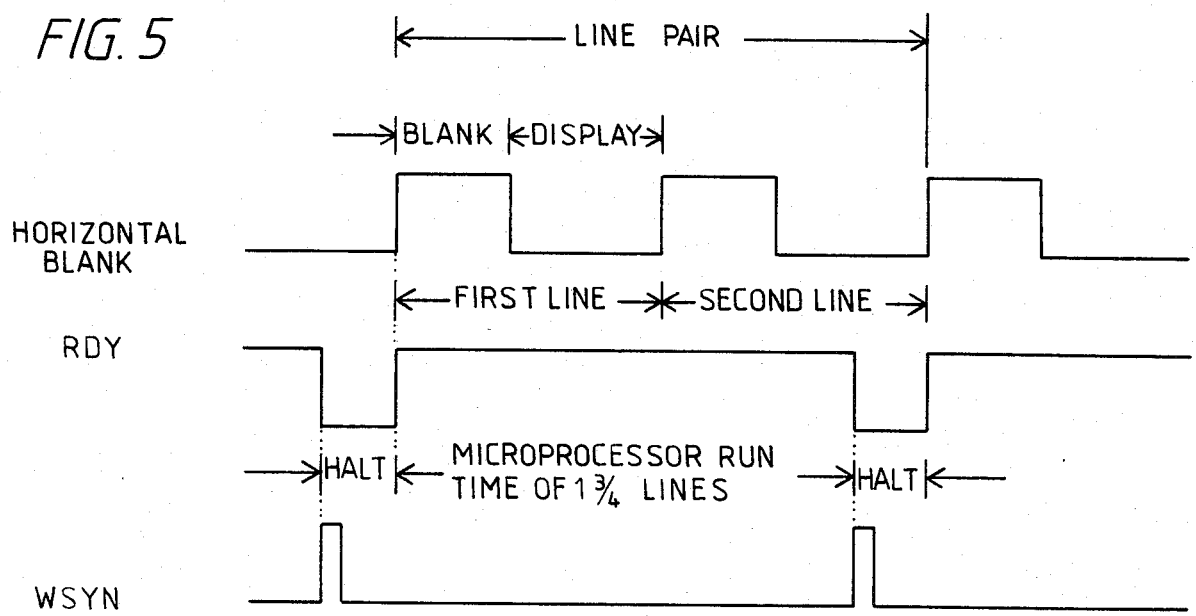

FIG. 6

| CHARACTERISTIC | SYMBOL | MIN | TYP | MAX | UNIT |
|---|---|---|---|---|---|
| OSC CYCLE TIME | TCYC | 260 | 280 | | NSEC |
| OSC DUTY CYCLE | TC/TCYC | 45 | 50 | 55 | PERCENT |
| OSC RISE-FALL TIMES | TRC-TFC | | | 25 | NSEC |
| φ 0 (OSC÷3) DELAY | T0 | | | 100 | NSEC |
| φ 0 RISE-FALL TIMES | TRO-TFO | | | 25 | NSEC |
| φ2 (DATA CLOCK) DELAY | T2 | | | 250 | NSEC |
| LUMINANCE DELAY | TOUT | | | 100 | NSEC |
| VERT. SYNC DELAY | TVS | | | 100 | NSEC |
| HORIZ. SYNC DELAY | THS | | | 100 | NSEC |
| WAIT FOR SYNC DELAY | TWS | | | 100 | NSEC |
| READY DELAY | TRDY | | | 100 | NSEC |
| R/W-ADD LEAD TIME | TLEAD | 180 | | | NSEC |
| DATA BUS LEAD TIME | TDATA | 300 | | | NSEC |
| ADD-DATA HOLD TIME | THOLD | 10 | | | NSEC |
| φ2 RISE-FALL TIME | TRF2 | | | 25 | NSEC |
| READ DATA LAG TIME | TDLAG | | | 395 | NSEC |

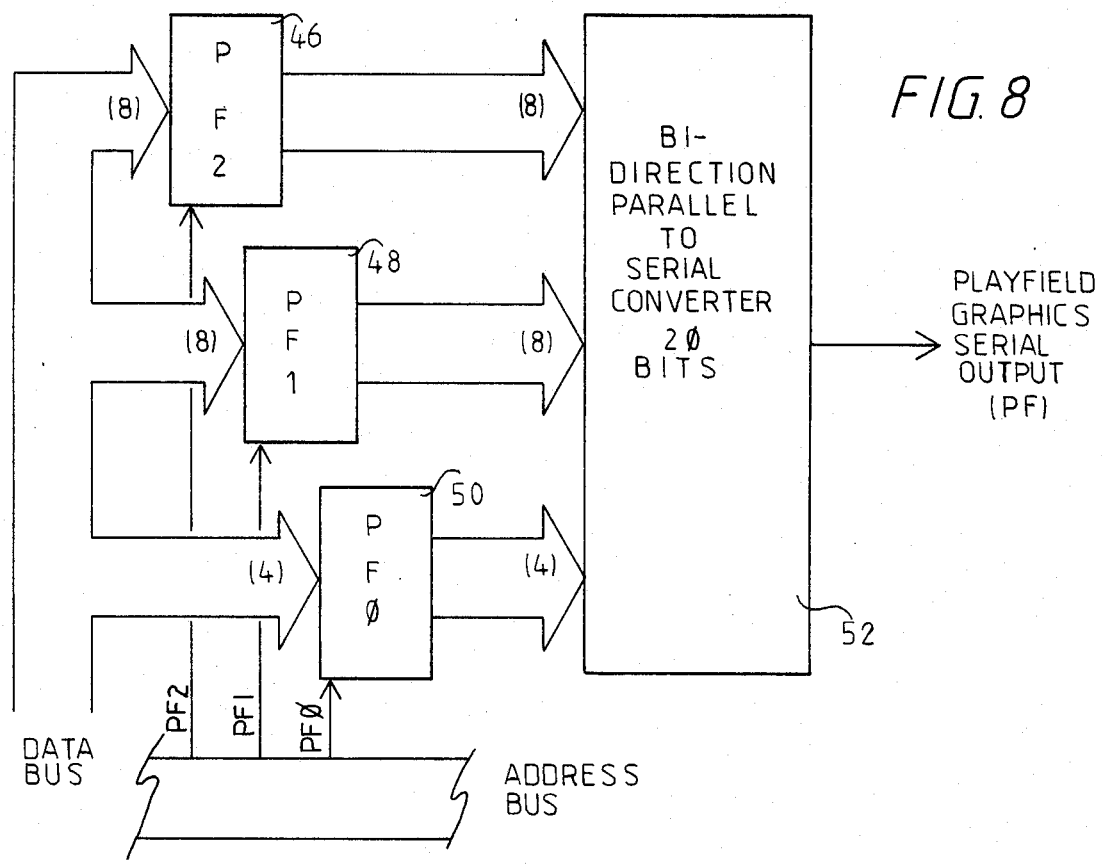
FIG. 8
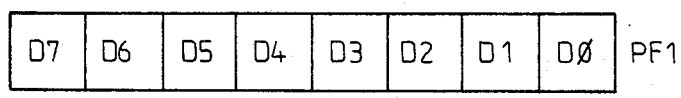
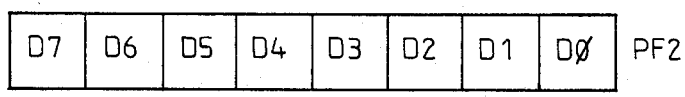
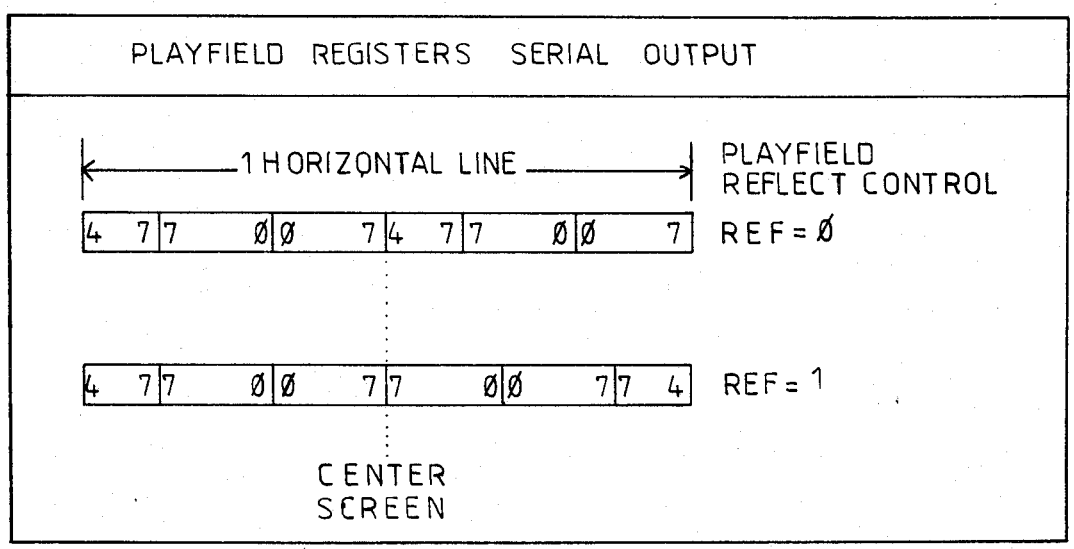
FIG. 9

FIG. 12

| | D2 | D1 | D0 | NUSIZ0 |
|---|---|---|---|---|

| | D2 | D1 | D0 | PLAYER NUMBER AND SIZE |
|---|---|---|---|---|
| A | 0 | 0 | 0 | |
| B | 0 | 0 | 1 | |
| C | 0 | 1 | 0 | |
| D | 0 | 1 | 1 | |
| E | 1 | 0 | 1 | |
| F | 1 | 0 | 1 | |
| G | 1 | 1 | 0 | |
| H | 1 | 1 | 1 | |

FIG. 13

| | D7 | D6 | D5 | D4 | | HMP0 |
|---|---|---|---|---|---|---|
| A | 0 | 1 | 1 | 1 | +7 | (HMP1) |
| B | 0 | 1 | 1 | 0 | +6 | (HMM0) |
| C | 0 | 1 | 0 | 0 | +5 | (HMM1) |
| D | 0 | 1 | 0 | 0 | +4 | (HMBL) |
| E | 0 | 0 | 1 | 1 | +3 | |
| F | 0 | 0 | 1 | 0 | +2 | |
| G | 0 | 0 | 0 | 1 | +1 | |
| H | 0 | 0 | 0 | 0 | 0 | |
| I | 1 | 1 | 1 | 1 | -1 | |
| J | 1 | 1 | 1 | 0 | -2 | |
| K | 1 | 1 | 0 | 1 | -3 | |
| L | 1 | 1 | 0 | 0 | -4 | |
| M | 1 | 0 | 1 | 1 | -5 | |
| N | 1 | 0 | 1 | 0 | -6 | |
| O | 1 | 0 | 0 | 1 | -7 | |
| P | 1 | 0 | 0 | 0 | -8 | |

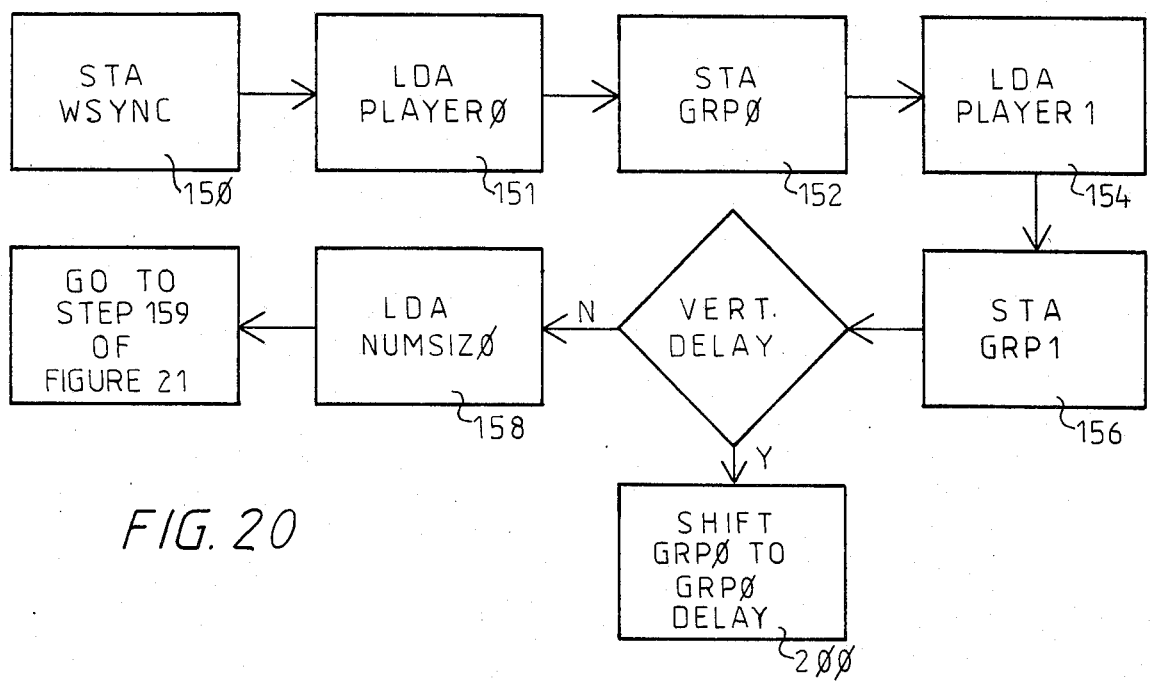

| ASSEMBLER CODE | CYCLE NUMBER | DESCRIPTION |
|---|---|---|
| STA WSYNC | 0 | STORE TO (STROBE) WSYNC |
| LDA (PLAYER0)Y | 5 | LOAD GRAPHICS DATA FOR P0 USING INDIRECT INDEXED ADDRESS MODE |
| STA GRP0 | 8 | STORE GRAPHICS DATA FOR P0 TO GRP0 REGISTER |
| LDA (PLAYER1),Y | 13 | LOAD GRAPHICS DATA FOR P1 USING INDIRECT INDEXED ADDRESSING MODE |
| STA GRP1 | 16 | STORE GRAPHICS DATA FOR P1 TO GRP1 REGISTER |
| LDA NUMSIZA | 19 | LOAD DATA RE: NUMBER AND SPACING OF FIRST TWO COPIES OF CONVOY MEMBERS |
| STA RESP0 | 22 | STORE TO (STROBE) RESP0 |
| STA NUSIZ0 | 25 | STORE DATA RE: NUMBER AND SPACING OF FIRST TWO COPIES TO NUSIZ0 REGISTER |
| LDA NUMSIZB | 28 | LOAD DATA RE: NUMBER AND SPACING OF NEXT TWO COPIES OF CONVOY MEMBERS. |

FIG. 23 CONTINUED

| ASSEMBLER CODE | CYCLE NUMBER | DESCRIPTION |
|---|---|---|
| NOP | 30 | NULL INSTRUCTION (WASTE TIME) |
| STA RESP0 | 33 | STORE TO (STROBE) RESP0 |
| STA NUSIZ0 | 36 | STORE DATA RE: NUMBER AND SPACING OF NEXT TWO COPIES TO NUSIZ0 REGISTER |
| LDA NUMSIZC | 39 | LOAD DATA RE: NUMBER AND SPACING OF NEXT TWO COPIES OF CONVOY MEMBERS |
| INY | 41 | INCREMENT RASTER LINE NUMBER IN Y-REGISTER |
| STA RESP0 | 44 | STORE TO (STROBE) RESP0 |
| STA NUSIZ0 | 47 | STORE DATA RE: NUMBER AND SPACING OF NEXT TWO COPIES OF NUSIZ0 REGISTER |
| LDA NUMSIZ0 | 50 | LOAD DATA RE: NUMBER AND SPACING OF NEXT TWO COPIES OF CONVOY MEMBERS |
| NOP | 52 | NULL INSTRUCTION (WASTE TIME) |
| STA RESP0 | 55 | STORE TO (STROBE) RESP0 |
| STA, NUSIZ0 | 58 | STORE DATA RE: NUMBER AND SPACING OF NEXT TWO COPIES OF NUSIZ0 REGISTER |
| LDA #0 | 60 | LOAD ZERO |
| STA ENABL | 63 | STORE ZERO TO ENABL REGISTER TO TURN OFF BALL GRAPHICS |
| DEX | 65 | DECREMENT X-REGISTER BOP COUNTER |
| BNE, KS01 | 67 | CONTINUE TO NEXT SECTION OF CODE IF LOOP COUNTER = 0 |
|  | 68 | BRANCH TO STA WSYNC IF LOOP COUNTER ≠ 0 |

PROCESS FOR DISPLAYING A PLURALITY OF OBJECTS ON A VIDEO SCREEN

BACKGROUND OF THE INVENTION

The present invention relates generally to video display systems, and more particularly, to a method used in conjunction with an Atari video computer system to more effectively display and control on a video display screen a larger number of high-resolution player graphics objects than before possible.

The Atari video computer system (VCS) is the subject of at least one U.S. Patent to Mayer, et al. (U.S. Pat. No. 4,112,422) and also of a number of technical articles which are discussed below. The VCS includes a MOS integrated circuit designed to interface between an 8-bit microprocessor and a television video display screen. The integrated circuit in the VCS is referred to as a television interface adapter (TIA). The VCS converts 8-bit parallel data into serial outputs for the color, luminosity and composite sync signals required by a video modulator. The VCS operates on a line by line basis, outputting the same information on every television line unless new data is written into it by the microprocessor. A hardware sync counter produces horizontal sync timing independent of the microprocessor. Vertical sync timing is supplied to the TIA by the microprocessor and is combined with the horizontal sync to form a composite sync signal.

Horizontal position counters in the TIA are used to trigger the serial output of registers holding five sets of data corresponding to horizontally movable high-resolution graphics originals which cause high-resolution graphics copies to be displayed on the video display screen. The five high-resolution graphics originals are comprised of two "players" (PO,PI), two "missiles" (MO,MI), and a "ball" (BL). In the context of this disclosure, an "original" refers only to the particular set of graphics data which is stored in graphics registers and causes copies corresponding thereto to be displayed on a video display screen; an "original" is not displayed on the video display screen, but merely determines the graphic form of the copies which are displayed. Each of the high-resolution copies is created and manipulated by a series of data registers in the TIA that the microprocessor can address and write into. The microprocessor can add to or subtract from the position counters to move the high-resolution graphics copies which are displayed on the display screen right or left along a given series of horizontal scan lines. The microprocessor determines all vertical position and motion by writing zeros for a blank line or other data for visible objects into the graphics registers in the TIA before each appropriate horizontal scan line.

Walls, clouds and other seldom moved objects which compose a playfield are produced by a low-resolution data register in the TIA called a playfield register. A 15-bit collision register in the TIA detects all fifteen possible two-object collisions between copies of the five high-resolution movable graphics originals and the low-resolution playfield. The collision register can be read and reset by the microprocessor. Six input ports are also provided in the TIA that can be read by the microprocessor. The input ports receive the updated status of various hand-held controllers. The input ports and the collision register are the only TIA addresses that can be read by the microprocessor. All other addresses are write-only. A more detailed discussion of the VCS and TIA is included below in the detailed description of the preferred embodiments of the present invention.

In the article *Design Case History: The Atari Video Computer System* (Perry and Wallich, IEEE Spectrum, March 1983), the reader is introduced not only to the basic design of the VCS, but also to a number of recent advanced programming techniques which have been developed to more effectively exploit the VCS. The article *Video Games Enter Technology Time Warp* (Brody, High Technology, June 1983) discusses a number of design and program limitations associated with the VCS. In particular, the VCS is limited as to how many high-resolution player graphics copies of an original can be made to appear in a controlled fashion along a given horizontal scan line of a video display screen. The VCS, as designed, is inherently capable of producing three copies which correspond to data for the two high-resolution player graphics originals (PO, P1) to display up to a total of six high-resolution player graphics copies along a given horizontal scan line. However, if both of the high-resolution player graphics originals are used to create a total of three or more high-resolution player graphic copies along a given series of horizontal scan lines of the video display screen, no further high-resolution player graphics objects can be created on the same scan lines by the VCS.

Given the relatively low cost and the large numbers of the VCS which are currently in the marketplace, the need existed to develop a method to more effectively exploit the VCS to display improved video graphics.

SUMMARY OF THE INVENTION

It is an object of the present invention to provide a process used in conjunction with an Atari video computer system (VCS) having a television interface adapter TIA to produce improved video graphics.

It is another object of the present invention to provide such a process which is capable of using data for one high-resolution player graphics original to display greater than three high-resolution player graphics copies thereof along the active portion of a given series of horizontal scan lines of a video display screen, thereby allowing use of the remaining high-resolution player graphics capabilities to display additional high-resolution graphics on the same series of horizontal scan lines.

It is another object of the present invention to provide a process as above which is capable of individually displaying or removing each high-resolution player graphics copy displayed.

It is another object of the present invention to provide a process used in conjunction with a VCS having a TIA whereby data for one high-resolution player graphics original is used, in combination with selectively timed reset operations and stores to a number/spacing register corresponding to the high-resolution player graphics original, to display greater than three high-resolution player graphics copies along a given series of horizontal scan lines of a video display screen.

It is another object of the present invention to provide a process used in conjunction with a VCS having a TIA whereby sets of data for two available high-resolution player graphics originals are used, in combination with selectively timed reset operations and stores to number/spacing registers corresponding to each high-resolution player graphics original, to display greater than three high-resolution player graphics copies along the active portion of a given series of horizontal scan lines.

It is another object of the present invention to provide a process used in conjunction with a VCS having a TIA whereby data for two high-resolution player graphics originals are used in combination with selectively timed reset operations during the active portion of a given series of horizontal scan lines to display greater than two graphically different high-resolution player graphics copies on the series of horizontal scan lines.

The above and other objects are achieved by a process for displaying a plurality of objects on a video display screen, used in conjunction with a video computer system (VCS). The VCS includes a central processing unit (CPU), in the form of a microprocessing unit (MPU), and a television interface adapter (TIA). According to the process, a first set of data corresponding to a first high-resolution player graphics original is stored into a first player graphics register in the TIA. After storing the first set of data, a reset address in the TIA which corresponds to the first high-resolution player graphics original is written to. After writing to the reset address, a second set of data corresponding to the number and spacing of copies of the first high-resolution player graphics original which are to appear on a given horizontal scan line is stored into a first control register means in the TIA. After storing the second set of data, the reset address of the TIA corresponding to the first high-resolution player graphics original is again written to, and a new second set of data corresponding to the number and spacing of the copies of the first high-resolution player graphics original which are to appear on a given horizontal scan line is again stored into the control register means in the TIA. While it is possible to exercise the first reset operation during the horizontal blank portion of the scan line, normally each of the above steps following the initial storing of the first set of data to the first player graphics register takes place during an active, or visible, portion of a horizontal scan line. Thus, in accordance with the present process, each of the multiple resets is followed by a storing operation into first control register means in the TIA during the active portion of a given horizontal scan line to produce greater than three copies of the first high-resolution player graphics original on the same series of horizontal scan lines.

In accordance with another aspect of the process, data for a second high-resolution player graphics original is used to provide high-resolution graphics capabilities on a given series of horizontal scan lines in addition to the multiple copies of the first high-resolution player graphics original. A second reset address in the TIA associated with a second high-resolution player graphics original is written to. Next, a set of data corresponding to the number and spacing of copies of the second high-resolution player graphics original which are to be displayed on a given series of horizontal scan lines is stored in a second control register means in the TIA corresponding to the second high-resolution player graphics original. Then, after storing the first set of data of the first high-resolution player graphics register, a set of data corresponding to the second high-resolution player graphics original is stored to a second high-resolution player graphics register in the TIA, resulting in the display of copies of the second high-resolution player graphics original. Next, during the active portion of the same horizontal scan line, multiple resets of the reset address and stores to the control register corresponding to the first high-resolution player graphics original results in the display of the desired number of portion copies of the first high-resolution player graphics original on the same horizontal scan line.

A second embodiment of the process provides means for using the first and second high-resolution player graphics originals and multiple resets during the active portion of the series of horizontal scan lines of one or both reset addresses corresponding thereto to display on any given series of horizontal scan lines greater than two graphically different high-resolution player graphics copies. A first set of data corresponding to a first high-resolution player graphics original is loaded into a first player graphics register in the TIA. A second set of data corresponding to the second high-resolution player graphics original is stored into a second player graphics register in the TIA. Then, during the active portion of a series of horizontal scan lines a first reset address in the TIA corresponding to the first high-resolution player graphics original is written to. Similarly, a second reset address in the TIA corresponding to the second high-resolution player graphics original is written to. Next, during the same active portion of the same horizontal scan line, and after writing to the first and second reset addresses in the TIA corresponding to the first and second high-resolution player graphics originals, a third graphically different set of data corresponding to a third graphically different high-resolution player graphics original is loaded into one of the two player graphics registers in the TIA. The reset address in the TIA corresponding to the player graphics register in which the third set of data was loaded is then written to.

As a result, in accordance with the second embodiment of the process, three graphically different high-resolution player graphics copies corresponding to the three graphically different high-resolution player graphics originals which were consecutively loaded into the two player graphics registers in the TIA are able to be displayed on the same series of horizontal scan lines of the video display screen. If desired, a fourth graphically different set of data corresponding to a fourth graphically different high-resolution player graphics original can be loaded into the remaining player graphics register in the TIA. Writing during the active portion of the same scan line to the reset address in the TIA which corresponds to the player graphics register in which the fourth set of data was loaded will cause the corresponding fourth graphically different high-resolution player grapics copy to be displayed on the same series of horizontal scan lines.

The above and other objects become more apparent from the following detailed description of its preferred embodiments.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like numerals identify like elements in the figures and in which:

FIG. 1 is a general block diagram representing the major elements of a standard video computer system.

FIG. 3 is a sectioned diagram of a video display screen used in the present invention.

FIGS. 4A through 4C are tables of the read-addresses which summarize the addressable functions of the TIA integrated circuit which composes a portion of the VCS as shown in the block diagram of FIG. 2.

FIG. 5 is a timing diagram of the horizontal synchronization characteristics of the TIA.

FIG. 6 is a table of various TIA timing characteristics and their associated parameters.

FIG. 8 is a block diagram of a playfield graphics circuit which composes a portion of the TIA chip shown above in FIG. 2.

FIG. 9 depicts the playfield registers of the TIA, including the serial output thereof.

FIG. 12 is a table depicting an 8-bit player position control register and the selectively available player positions.

FIG. 13 is a table depicting the addresses which write horizontal motion values into horizontal motion registers in the TIA.

FIG. 20 is another modified block diagram of the inventive process shown above in FIG. 18 and FIG. 19.

FIG. 23 is a table of a portion of the assembler code for the process and the associated machine cycle numbers on which the commands complete their described function.

DETAILED DESCRIPTION OF THE PREFERRED EMBODIMENTS

The Atari VCS

Figure 2:
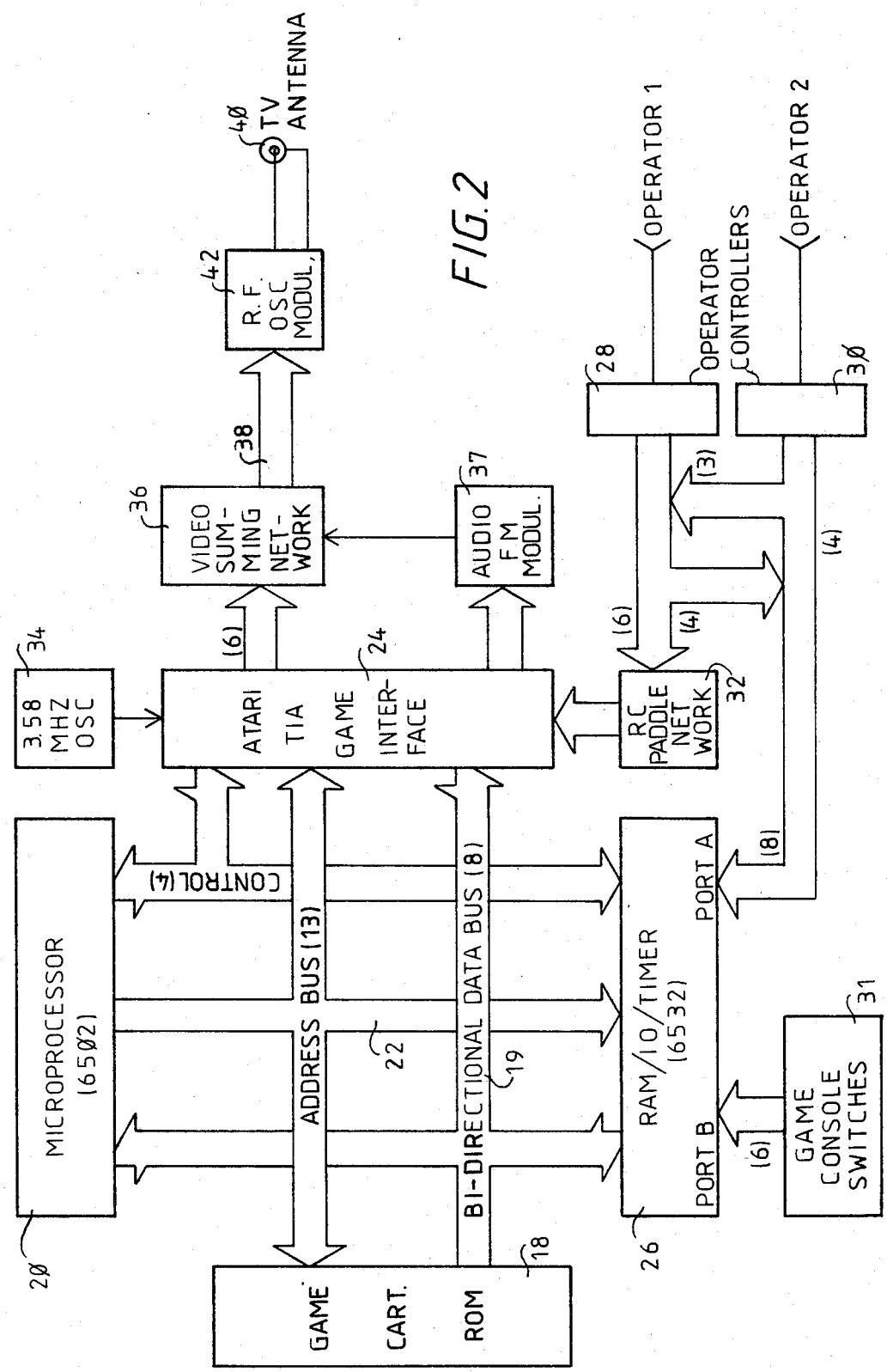
FIG. 2 is a block diagram of an Atari VCS used in conjunction with the present invention.
Figure 7A:
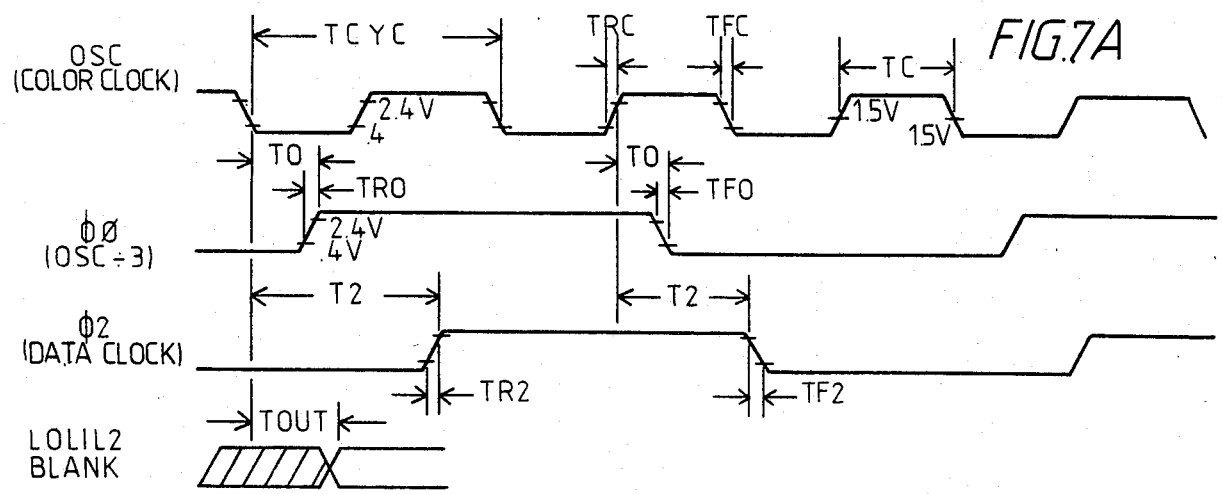
FIGS. 7A through 7E are timing diagrams of selected timing characteristics of the TIA listed in the table of FIG. 6.
Figure 7B:
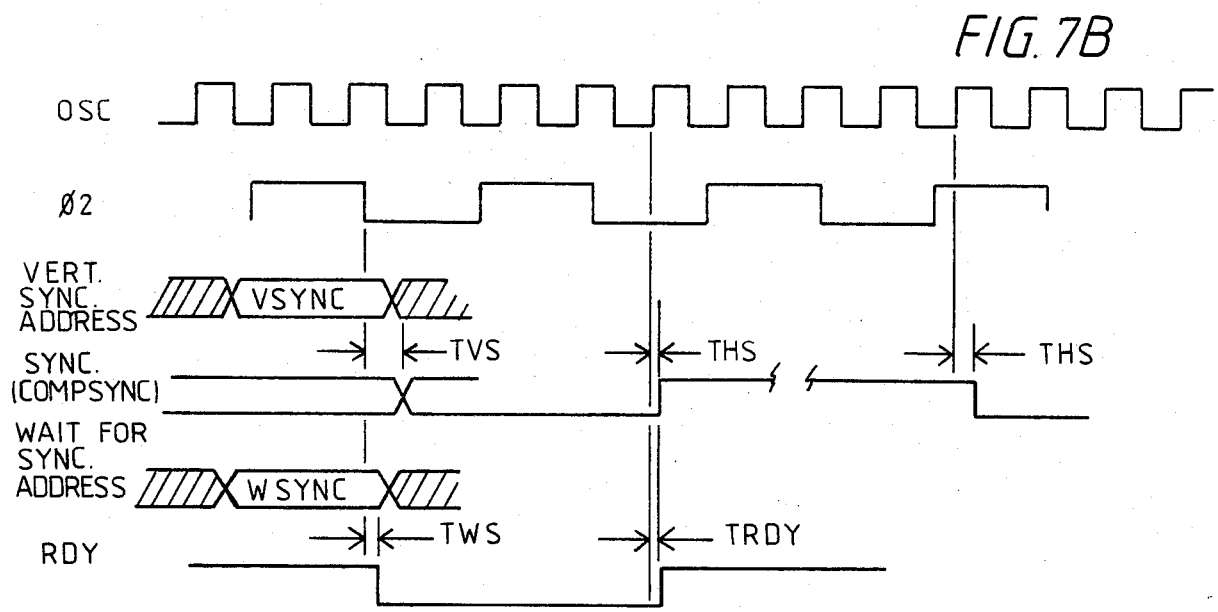
Figure 7C:
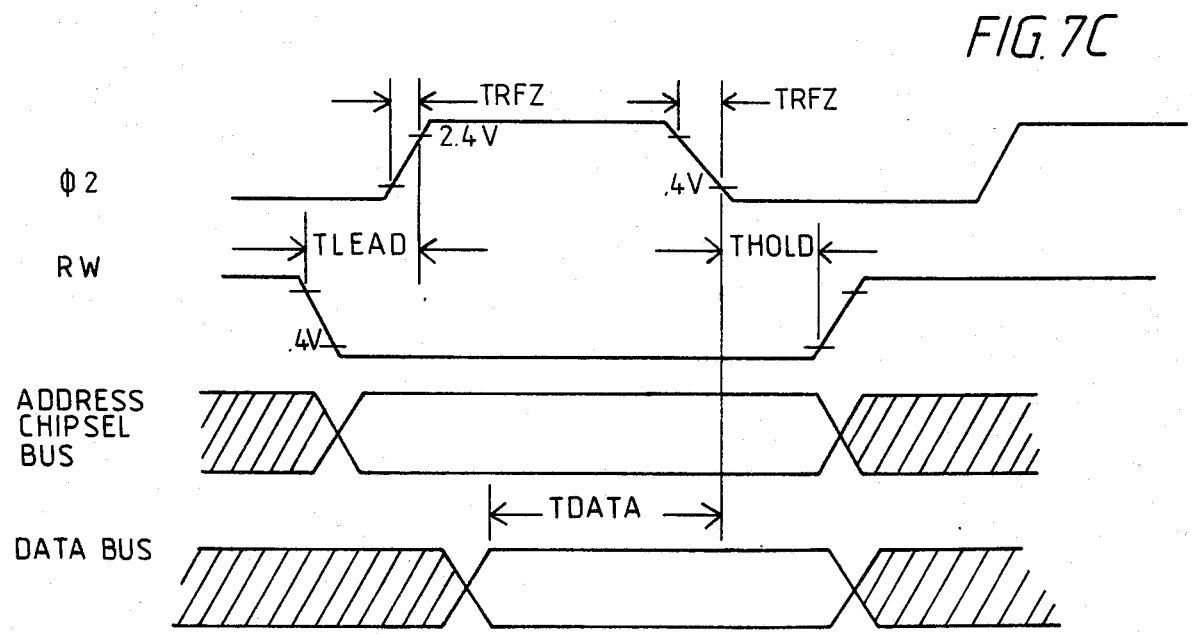
Figure 7D:
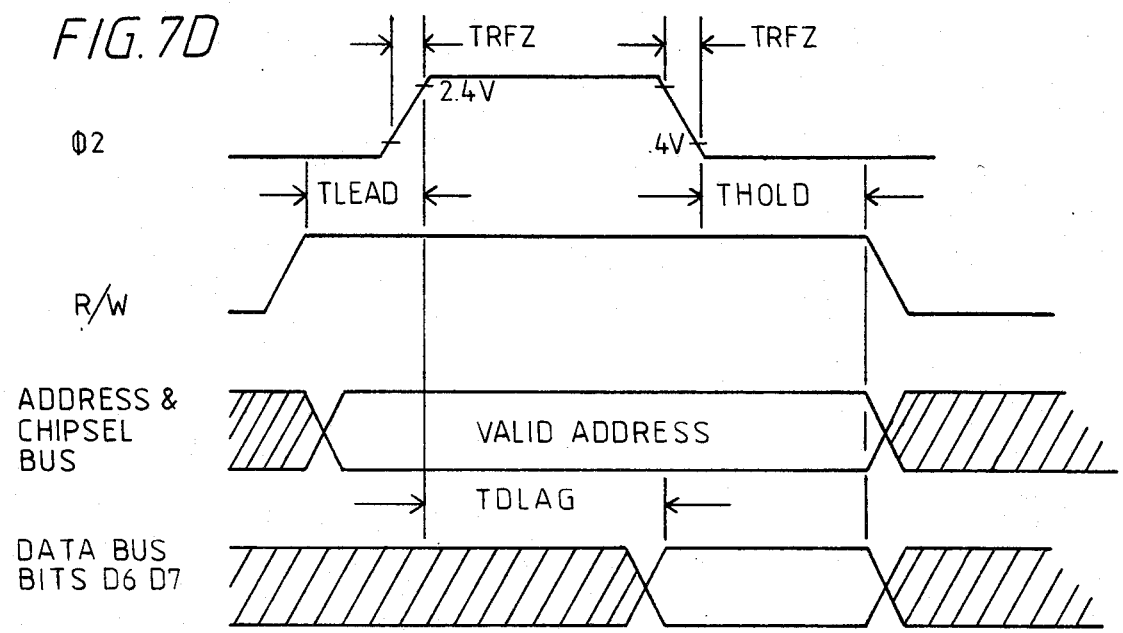
Figure 7E:
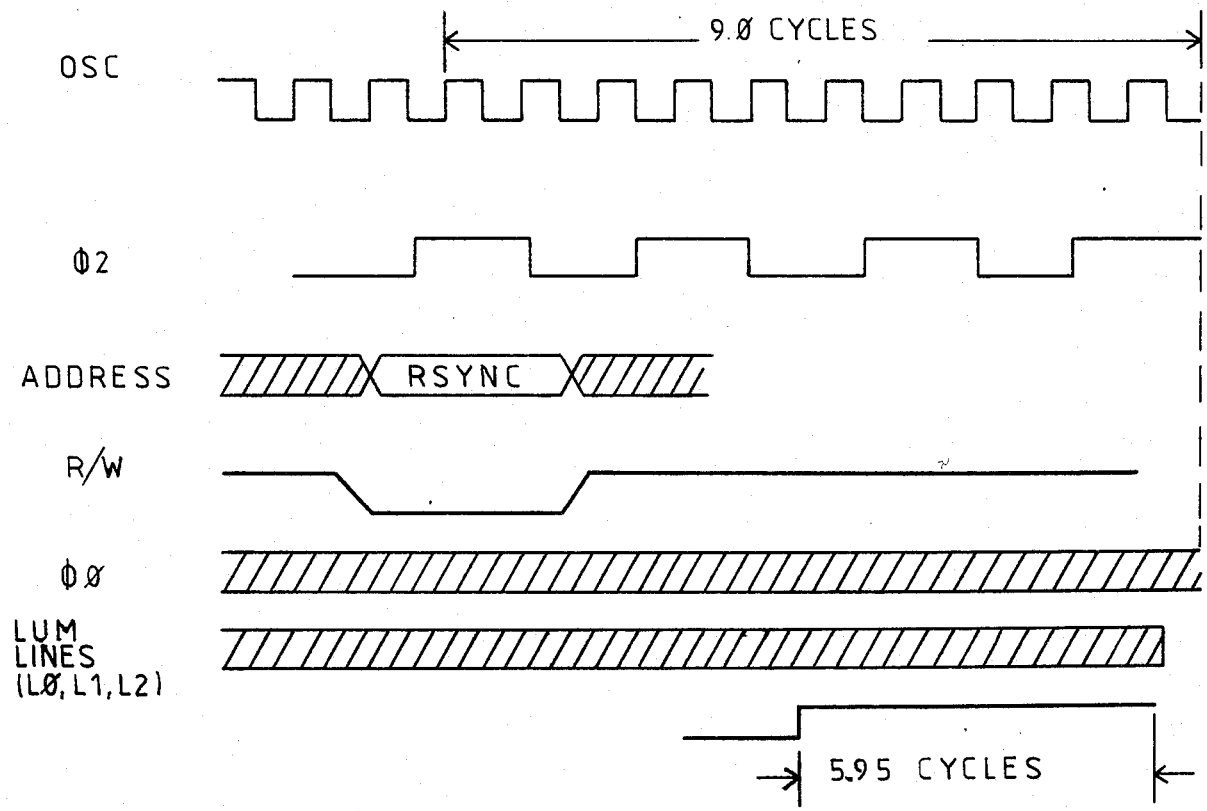

As shown in FIG. 1, a video game has four essential components: a game machine 10, a game-play cartridge 12, operator controls 14, and a video display screen 16. Generally, the video display screen 16 comprises a normal TV set. The game machine 10 and the game-play cartridge 12 set the boundaries on game quality. Referring additionally to FIG. 2, the game-play cartridge 12 generally includes read-only memory (ROM) 18 which contains the configuration or architecture of game-play programs for one or more video games which are to be played. A 6502 microprocessor 20 communicates via an address bus 22 to the game-play cartridge ROM 18 and to an Atari television interface adapter (TIA) MOS integrated circuit 24. In addition, the microprocessor 20 has access via address bus 22 to 128 bytes of random access memory (RAM) in the form of 6532 integrated circuit 26. The 6532 integrated circuit 26 also comprises various input/ouput (I/O) circuits and timer circuits. The game-play ROM 18 communicates with the microprocessor 20, the TIA 24, and the 6532 integrated circuit 26 via a bi-directional data bus 19.

The microprocessor 20 controls the playfield graphics, and at the same time continuously scans operator controls 28, 30 which control the motion of the player graphics. Operator One and Operator Two communicate a total of 8 bits of data to the microprocessor 20 through port A of the 6532 input/output integrated circuit 26. Six bits of data from game console switches 31 are accessed through port B of the 6532 integrated circuit 26. Operator One and Operator Two also communicate a total of 6 bits of data to the TIA 24 via an RC paddle network 32. A 3.58 megahertz (MHz) oscillator 34 provides hardware clocking for the TIA 24.

The outputs of the TIA 24 are connected to a video summing network 36, where appropriate horizontal and vertical sync signals are added to form an on-line composite video signal 38. An audio FM modulator 37 adds the TIA audio output to the composite video signal 38. The composite video signal 38 from the summing network 36 is coupled to TV antennae terminals 40 through an RF oscillator modulator 42. Such a modulator is normally tunable to specific channels of the VHF band of the TV. Since the present invention relates directly to a process used in conjunction with the Atari TIA 24, to display a plurality of objects on the display screen 16, a more detailed description of the TIA 24 will follow.

Referring now to FIG. 3, a single television "frame" consists of 262 horizontal scan lines. Each horizontal scan line is divided by 228 clock counts (3.58 MHz). The visible, or active, portion of the TV picture frame is drawn line by line from the top down, sixty times per second, and actually consists of only a portion of the entire frame. A complete frame will typically consist of three vertical sync lines, 37 vertical blank lines, 192 visible TV picture lines and 30 overscan lines. Each horizontal scan line starts with 68 clock counts of horizontal blanking not visible on the TV screen, followed by 160 clock counts of visible TV picture. When the electron beam reaches the end of a horizontal scan line, it returns to the left side of the screen, waits for the 68 horizontal blank clock counts, and proceeds to draw the next line of the visible TV picture.

All horizontal timing is taken care of by hardware. The microprocessor, 20, however, must directly control vertical timing to signal the start of the next frame. When the last line of the previous frame is detected, the microprocessor 20 must generate the 3 lines of vertical sync, the 37 lines of vertical blank, the 192 lines of actual TV picture, and the 30 lines of overscan. Generally, both the vertical sync and vertical blank signals can be simply turned on and off at the appropriate times, freeing the microprocessor 20 for other activities during their execution.

The actual 192 scan lines of TV picture are drawn one scan line at a time by having the microprocessor 20 enter the data for that line into the TIA 24, which then converts the data into serial video signals. The microprocessor 20 must insure that the registers are loaded ahead of the electron beam on each line. Since one microprocessor machine cycle equals three clock counts, the programmer only has 76 machine cycles on each horizontal scan line to construct the actual picture. If the programmer wants to change data during an active period, there are even more severe timing constraints. Originally, to allow more time for the software, it was customary in the prior art to update the TIA 24 every two scan lines. Presently, however, single line resolution is achieved by updating graphics data during the blanking and/or active portion of each scan line. The remaining 70 non-visible scan lines will provide 5,320 machine cycles for housekeeping and game logic. Such activities as calculating the new position of a player, updating the score, and checking for new inputs are typically carried out during this time.

Shown in FIGS. 4A through 4C is a table of read-write addresses which summarize the addressable functions of the TIA 24. Registers in the TIA 24 are addressed by the microprocessor 20 as part of its overall RAM/ROM memory space. There are no registers in the TIA 24 that are both read and write. Some addresses, however, are both read and write, with write data going into one register and read data returning from a different register. Some registers are 8 bits wide, some only 1 bit, and some (strobes) have no bits, performing only control functions such as resets when their address is written to. The only registers the microprocessor 20 can read are the collision registers and input port registers, shown in FIG 16. These registers are conveniently arranged so that data bits of interest always appear as data bits D6 or D7 for easy access. If a read-write line (not shown) is low, the data bits indicated in the tables of FIGS. 4A through 4C will be written into the addressed write location when a phase-2 ($\phi$2, see FIGS. 6 and 7A through 7E below) clock transgresses from high to low. If the read-write line is high, the addressed location can be read by the microprocessor 20 on data lines D6 and D7 when the phase-2 ($\phi$2) clock is high. As can be seen in FIGS. 4A through 4C, all registers have fixed address locations and commonly used address names for easy reference.

A hardware counter on the TIA 24 produces all horizontal timing indepenent of the microprocessor 20. The 3.58 MHz oscillator 34 generates clock pulses, called color-clocks, which are input to a pulse counter 44 in the TIA 24 shown in FIG. 11. This counter 44 allows 160 color-clocks, after the horizontal blank portion of the scan line, for the electron beam to reach the right edge of the display screen 16, then generates a horizontal sync signal (HSYNC) to return the electron beam to the left edge. The counter 44 also generates a signal to turn the beam off during its return time of 68 color-clocks. Vertical timing for the vertical sync (3 scan lines) and vertical blank (32 scan lines) functions is established by the microprocessor 20 by writing a zero or one into one-bit addressable registers. These registers are labeled VSYNC and VBLANK, and are shown in the table of FIG. 4A. The horizontal sync signal and the output of the one-bit VSYNC register are combined together in the video summing network 36 to produce a composite sync signal 38. This composite sync signal 38 drives the TIA 24 output pad to an external composite video resistor network (not shown).

Referring now to FIG. 6 and FIGS. 7A through 7E, the 3.58 MHz oscillator 34 also clocks a divide-by-three counter (not shown) in the TIA 24 whose output (1.19 MHz) is buffered to drive an output pad labeled Phase Zero ($\phi$0). The Phase Zero pad provides the input Phase Zero ($\phi$0) clock to the microprocessor 20, which then produces the system Phase Two ($\phi$2) clock (1.19 MHz). Various other timing characteristics, symbols and parameters are listed in the table of FIG. 6. Timing relationships of selected of the characteristics become clear after examining the diagrams of FIGS. 7A through 7E.

Game-play program loops and various graphics options often require different lengths of time to run depending on branch decisions made within the program. Shown in FIG. 5 is additional synchronization required between the game-play program and the hardware. The additional synchronization is achieved with a one-bit latch called WSYNC (wait for sync). When the microprocessor 20 finishes a routine such as loading registers in the TIA 24 for the next horizontal scan line, or computing new vertical locations during vertical blank, it can address WSYNC, setting the latch high. When the WSYNC latch is high, it drives an output pad connected to the microprocessor ready line (RDY) to zero. A logic zero on the RDY line causes the microprocessor 20 to halt operations and wait. As shown in FIG. 5, the WSYNC latch is automatically reset to logic zero by the leading edge of the next horizontal blank timing signal, releasing the ready line, and allowing the microprocessor 20 to begin its computation and writing to the registers for the next horizontal scan line or line pair.

There are several types of graphics which can be created by the TIA. Shown in FIG. 8 is a block diagram of a low-resolution playfield graphics circuit which composes a portion of the TIA 24. Objects such as walls, clouds and the score, which are not often required to move, are written into a 20-bit register called the playfield register, referenced generally by the numeral 45. The playfield graphics register 45 is shown in FIG. 8 as three separate registers PF2 (8 bits), PF1 (8 bits), and PF0 (4 bits), referenced by the numerals 46, 48 and 50, respectfully. The playfield register 45 is loaded from the data bus 19 by three separate write addresses, PF0, PF1 and PF2. The playfield register may be loaded at any time. To clear the playfield register, zeros must be written into all three addresses, PF0, PF1 and PF2.

Referring additionally to FIG. 9, the playfield register 45, comprising the PF0, PF1 and PF2 portions of the 20 bits of data, is a low-resolution graphics register, and is written into to draw only the left half of the the visible portion of the TV screen. The right half of the screen is drawn by software selection of either a duplication or a reflection (mirror image) of the left half. The playfield register 45 is automatically scanned and converted to serial output by a bi-directional shift register 52 clocked at a rate which spreads the 20 bits of data out over the left half of the unblanked portion of the horizontal scan line. The PF0 register 50 is 4 bits wide and constructs the first 4 bits of the playfield, starting at the left edge of the visible portion of the TV screen. The PF1 register 48 constructs the next 8 bits, and the PF2 register 46 constructs the last 8 bits, which end at the center of the visible portion of the screen. The automatic scanning is initiated by the end of the horizontal blank signal which occurs at the left edge of the visible portion of the TV screen. A reflected playfield may be requested by writing a one into data bit D0 of the playfield control register (CTRLPF) shown in FIG. 10. To make the right half of the playfield a duplication or copy of the left half a zero is written to data bit D0 of the playfield control register (CTRLPF).

Figures 10, 11:
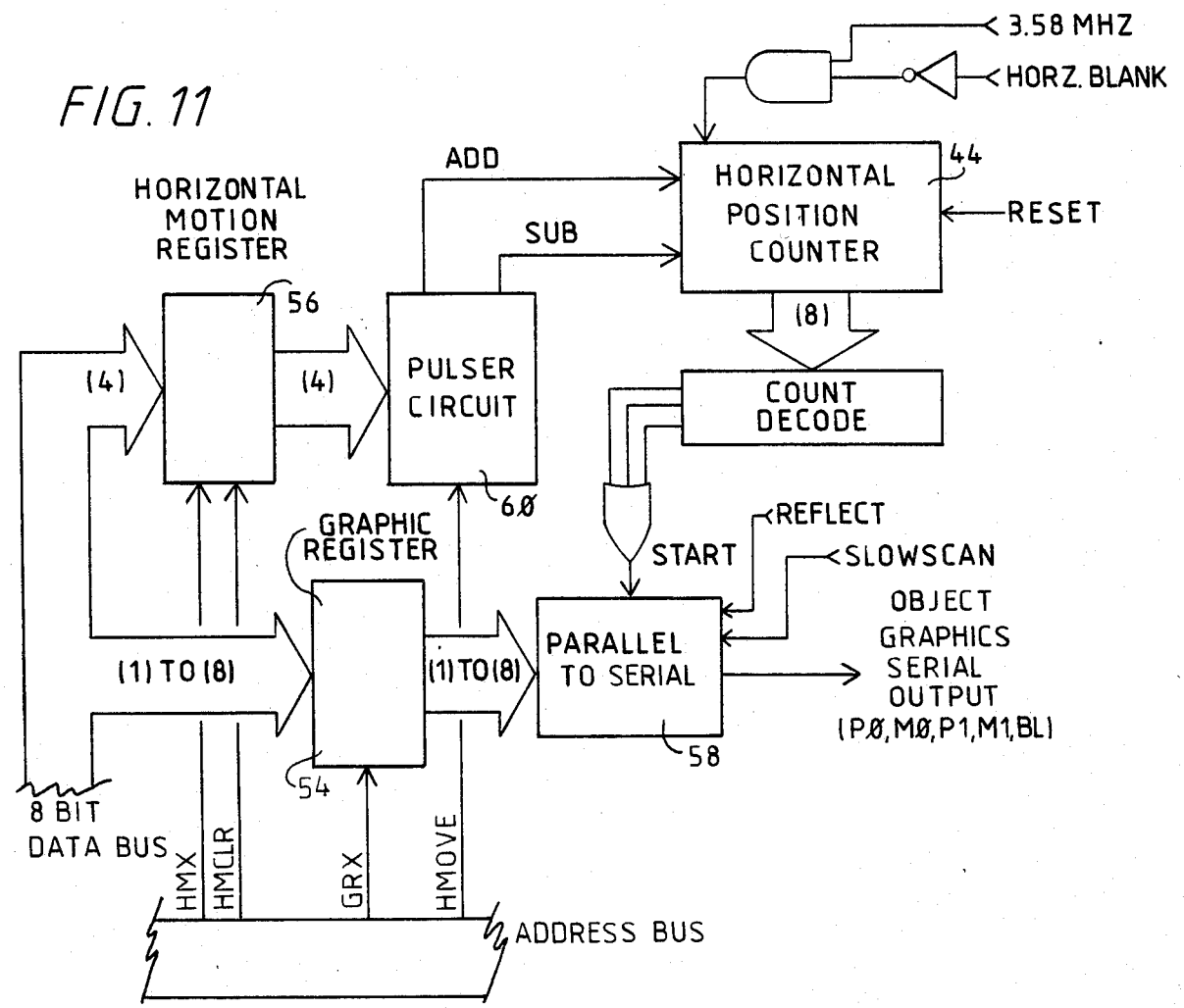
FIG. 10 depicts an address used to write into the playfield control register and its respective ball-size bit functions.
FIG. 11 is a block diagram of a horizontal positioning circuit which composes a portion of the TIA.

The fixed playfield graphics are created by a graphics register, which starts its serial output at the beginning of the visible portion of the television scan line. The TIA 24 also includes registers for five movable graphics types, whose serial outputs are triggered by five separate horizontal position counters every time these counters pass through a zero count. Shown in FIG. 11 is a typical horizontal counter circuit for one of the five serial graphics outputs. A horizontal position counter 44 is clocked continuously during the unblanked portion of every horizontal line and its count length is exactly equal to the normal number of clocks applied to them during this time. Generally, the horizontal position counter 44 passes through zero at the same location during each horizontal scan line and, unless these locations are altered, the triggered output will have no horizontal motion.

There are five registers for the movable graphics: two "missile graphics" registers (M0,M1), two "player graphics" registers (P0,P1) and a "ball graphics" register (BL). Each register, referenced by the numeral 54, has an associated horizontal counter circuit similar to that shown in FIG. 11. If extra clocks are supplied to the horizontal position counter 44 associated with any of the movable graphics (or normal clocks suppressed), the zero crossing time will shift and the displayed graphics will have moved left or right. Specifically, each player and missile counter has additional decodes so that the counters can provide from one to three strobes which appear on the scan line at the same position as the multiple resets, depending on data for the number/spacing register (discussed below). All position counters 44 can be reset to zero count by the microprocessor 20 at any time by a write instruction to the associated reset address in the TIA (RESBL,RESM0,RESM1,RESP0,RESP1). If a reset operation occurs during the blanked portion of a horizontal scan line, the object will appear at the left side of the visible portion of the television screen. Some position counters 44 have extra decodes to trigger multiple copies on a given horizontal line of the same high-resolution player graphics original data.

The two missile graphics registers 54 will draw a missile on any scan line by writing a one to the associated one-bit enable missile register (ENAM0,ENAM1) shown in the table of FIG. 4B. Writing a zero to one of these registers will disable the respective graphics register 54. The left edge of each missile is positioned by a horizontal motion register 56, but the right edge is a function of how wide the missile is made. Width of a missile is controlled by writing into data bits D4 and D5 of the number/size registers (NUSIZ0,NUSIZ1) as shown in the table of FIG. 4A. The effect is to selectively stretch the missile out over one, two, four or eight color clock counts. The missile position counter 44 has a second type of reset in addition to the previously discussed horizontal position reset. The extra reset address (RESM0,RESM1), shown in the table of FIG. 4B, writes data bit D1 into a one-bit register whose output is used to center the missile with its corresponding player graphics (P0, P1). The effect is to disable the missile serial output (M0,M1).

The ball graphics register 54 works similarly to the missile registers. Writing a one to the one-bit enable ball register (ENABL) shown in the table of FIG. 4B, enables the ball graphics register 54 until the one-bit enable register (ENABL) 54 is disabled. The ball can also be stretched to widths of one, two, four or eight color-clock counts by writing to data bits D4 and D5 of the CTRLPF register as shown in FIG. 10. The ball position counter 44 has only the zero crossing decode, and therefore cannot trigger multiple copies of the ball graphics.

Referring still to FIG. 11, each of the player graphics circuits consists of an 8-bit parallel register 54 (GRP0,GRP1) and a bi-directional parallel to serial scan counter 58 that converts the parallel data into serial output. Thus, the player graphics (P0,P1) each have 8 bits (or pixels) of graphics, making the player graphics (P0,P1) the only available high-resolution graphics. Data bit D3 of a one-bit control register (REFP0,REFP1) determines the direction (reflection) of the parallel to serial scan. The scan counter 58 outputs in order either data bits D7 through D0, or data bits D0 through D7, thus allowing reflection or horizontal flipping of the player serial graphics data without having to flip the microprocessor data. The clock into the scan counter 58 can be controlled by three bits of the number/spacing control registers (NUSIZ0,NUSIZ1) to slow the scan rate and stretch the 8-bits of serial graphics over widths of 8, 16 or 32 clocks of horizontal scan line time. These same control bits are used in the player/missile position counters 44 to control multiple copies, so only three player widths, or scan rates, are available.

Referring now to FIG. 12, each player position counter 44 has three decodes in addition to the zero crossing decode. These decodes are controlled by data bits D0, D1, and D2 of the 8-bit number/spacing control registers (NUSIZ0,NUSIZ1). The number/spacing control registers trigger one, two, or three copies of the player original, each 8 clocks wide, at various spacings across a single series of horizontal scan lines as represented by the letters A through P in the table of FIG. 12.

Referring again to FIG. 11 and additionally to FIG. 13, horizontal motion is provided to allow the programmer to move any of the five graphics objects (P0,M0,P1,M1,BL) on a series of horizontal scan lines relative to their current horizontal position. Listed on the table of FIG. 4B are the addresses of the five write-only registers on the TIA 24 which contain the horizontal motion values for each of the five movable graphics objects. Each horizontal motion register 56 is associated with the horizontal counter circuit shown in FIG. 11 for the respective graphics object. A write operation to each respective reset address initially sets, or course adjusts, the horizontal counter circuit. Bits D4 through D7 of the 8-bit data bus 19 are written into the address to increment or decrement, or fine tune, the horizontal motion register 56 with motion values. The horizontal motion register 56 supplies extra or fewer clocks to the horizontal position counter 44 only when commanded to do so by an HMOVE address from the microprocessor 20 to a pulser circuit 60. Each horizontal motion register 56 may be cleared to zero simultaneously by an HMCLR command from the microprocessor 20, or individually by loading zeros into each bit of the register 56. The horizontal motion register 56 contains 4 bits of data, and may be loaded with positive values (left motion) as shown by cases A through G of FIG. 13, negative values (right motion) as shown by cases I through P, or a zero value (no motion), shown as case H in FIG. 13. Negative values are represented in two's complement format.

Each horizontal motion register 56 may be loaded or cleared at almost any time. The motion, or increment, values they contain will be used only when an HMOVE register is addressed. All five motion values will be used simultaneously in all five horizontal position counters 44. The only timing constraint on this operation is that the HMOVE command must be located in the microprocessor program immediately after a wait-for-sync (WSYNC) command. Such a constraint insures that the HMOVE operation begins at the leading edge of the horizontal blank signal. Thus, when the HMOVE register is addressed, all five motion registers 56 move their respective object graphics horizontally on a given scan line.

Figure 14:
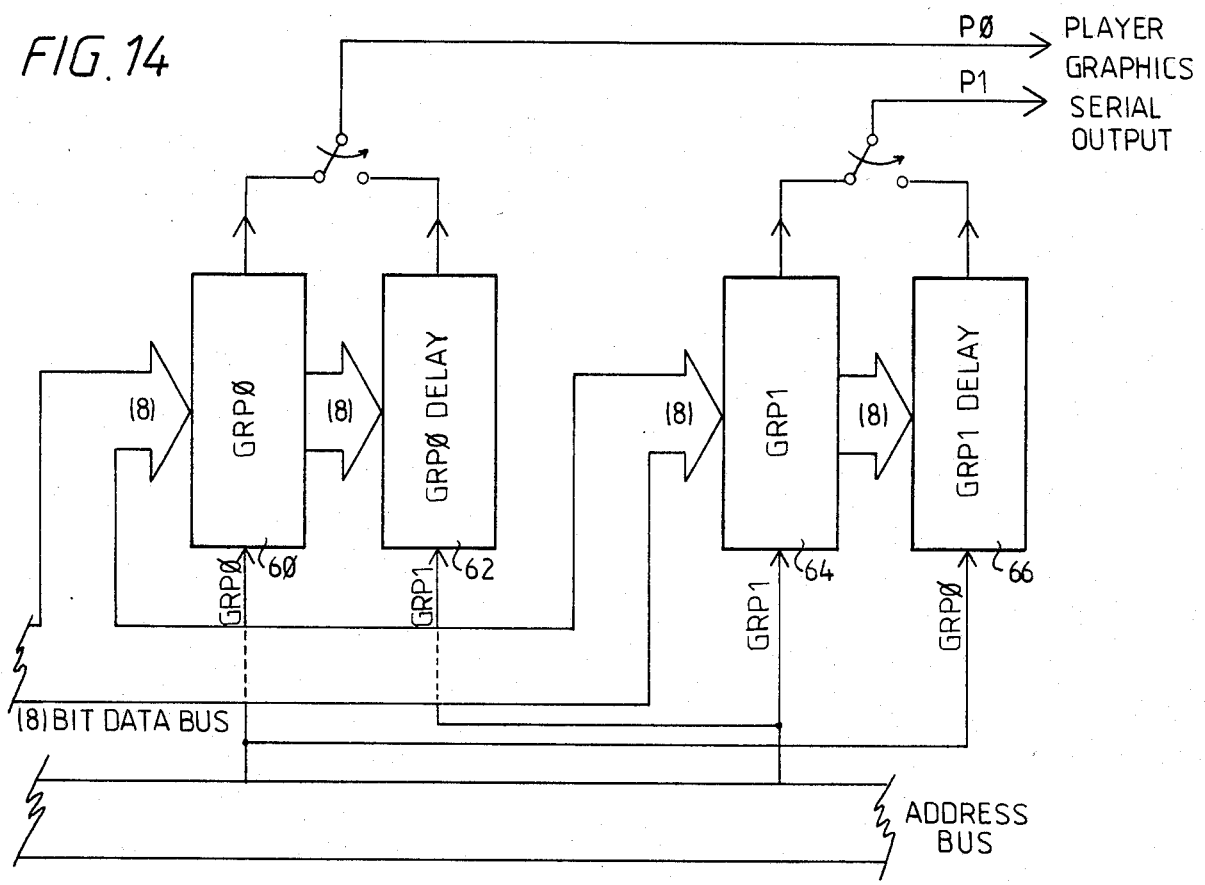
FIG. 14 is a more detailed block diagram of a vertical delay circuit which composes a portion of the TIA.

Referring to FIG. 14, each player graphics register 54 actually consists of two 8-bit parallel registers. The graphics register for the first player graphics, Player Zero (P0), comprises an undelayed register 60 and a delayed register 62. Likewise, the graphics registers for the second player graphics, Player One (P1), comprises an undelayed register 64 and a delayed register 66. The undelayed registers 60, 64 are loaded from the microprocessor 8-bit data bus 19. The delayed registers 62, 66 are automatically loaded in parallel from the output of the respective undelayed register 60, 64. The result of such an arrangement is a vertical delay operation.

Generally, a large amount of microprocessor time is required to generate player, missile and playfield graphics and to load graphics into the various TIA registers. Therefore, in the prior art, individual player graphics registers were generally loaded every two lines and used twice for serial output between loads. This type of programming limited the vertical height resolution of objects to multiples of two lines. It also limited the resolution of vertical motion to two line jumps. However, vertical motion was resolved to single line jumps by the use of the second delayed graphics registers 62, 66 that could be automatically parallel loaded from the output of the first. The automatic parallel loading of the delayed registers 62, 66 occurs one line time after the undelayed registers 60, 64 were loaded from the data bus 19. Thus, the delayed graphics registers 62, 66 output was always delayed vertically by one line. Vertical Delay control bits (VDELP0, VDELP1), shown in the table of FIG. 4B, select which of the two registers is to be used for serial output. If a control bit (VDELP0, VDELP1) is addressed by the microprocessor 20 between picture frames, the player graphics object to be displayed will be moved down (delayed) by one line during the next picture frame. In most of the prior art programming applications, Player Zero (P0) graphics and Player One (P1) graphics were loaded alternately, during the horizontal blank time just prior to each line. Since the GRP0 and GRP1 addresses from the microprocessor 20 alternate, they were delayed by one line from each other. The GRP0 address decode could therefore be used to load the delayed graphics 66 register for Player One (P1), and the GRP1 address likewise to load the delayed graphics register 62 for Player Zero (P0). The vertical delay bits (VDELP0,VDELP1) then select delayed or undelayed registers for Player Zero (P0) and Player One (P1) as serial outputs. As is discussed below, the current invention obviates the need for use of the vertical delay operation.

Figure 15:
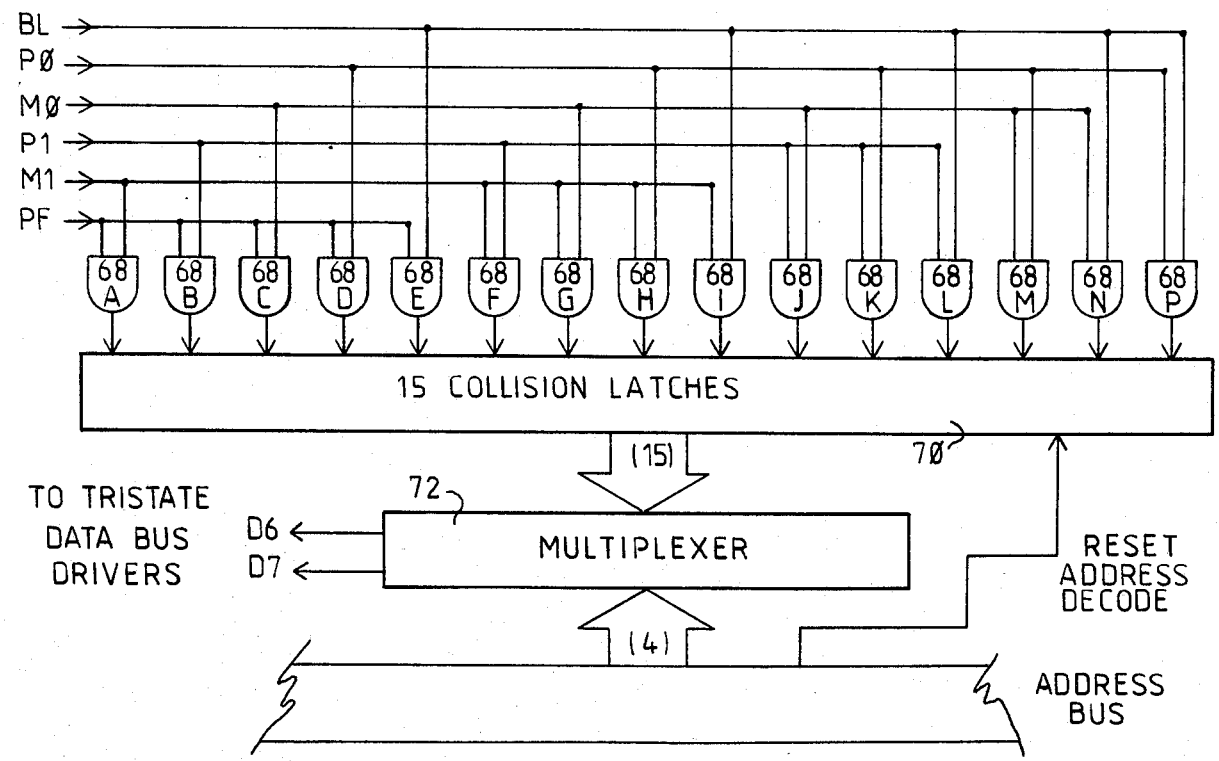
FIG. 15 is a more detailed diagram of a collision detection circuit which composes a portion of the TIA.

Shown in FIG. 15 are the collision detection latches of the TIA 24. The serial outputs from all the player graphics registers 60, 62, 64, 66 represent the real-time horizontal location of objects on the television screen. If any of these outputs occur at the same time, they will overlap or collide on the screen. There are six objects generated by the TIA 24, five moving (P0,M0,P1,M1,BL) and one playfield, (PF), allowing for fifteen possible two object collisions. The collisions are detected by fifteen AND gates 68A through 68P whenever they occur, and are stored in fifteen individual latch register bits referenced generally by the block 70. The microprocessor 20 can read these fifteen collision bits on data lines D6 and D7 of the data bus 19 by addressing them two at a time through a multiplexor 72. A logic one on the data line in either bits D6 or D7 indicates the collision which it records has occurred. The collision latches 70 can be read at any time, but generally, a reading operation is done during the vertical blank period after all possible collisions have occurred. The collision latches 70 are reset simultaneously by the microprocessor 20 using the reset address CXCLR.

Figure 16:
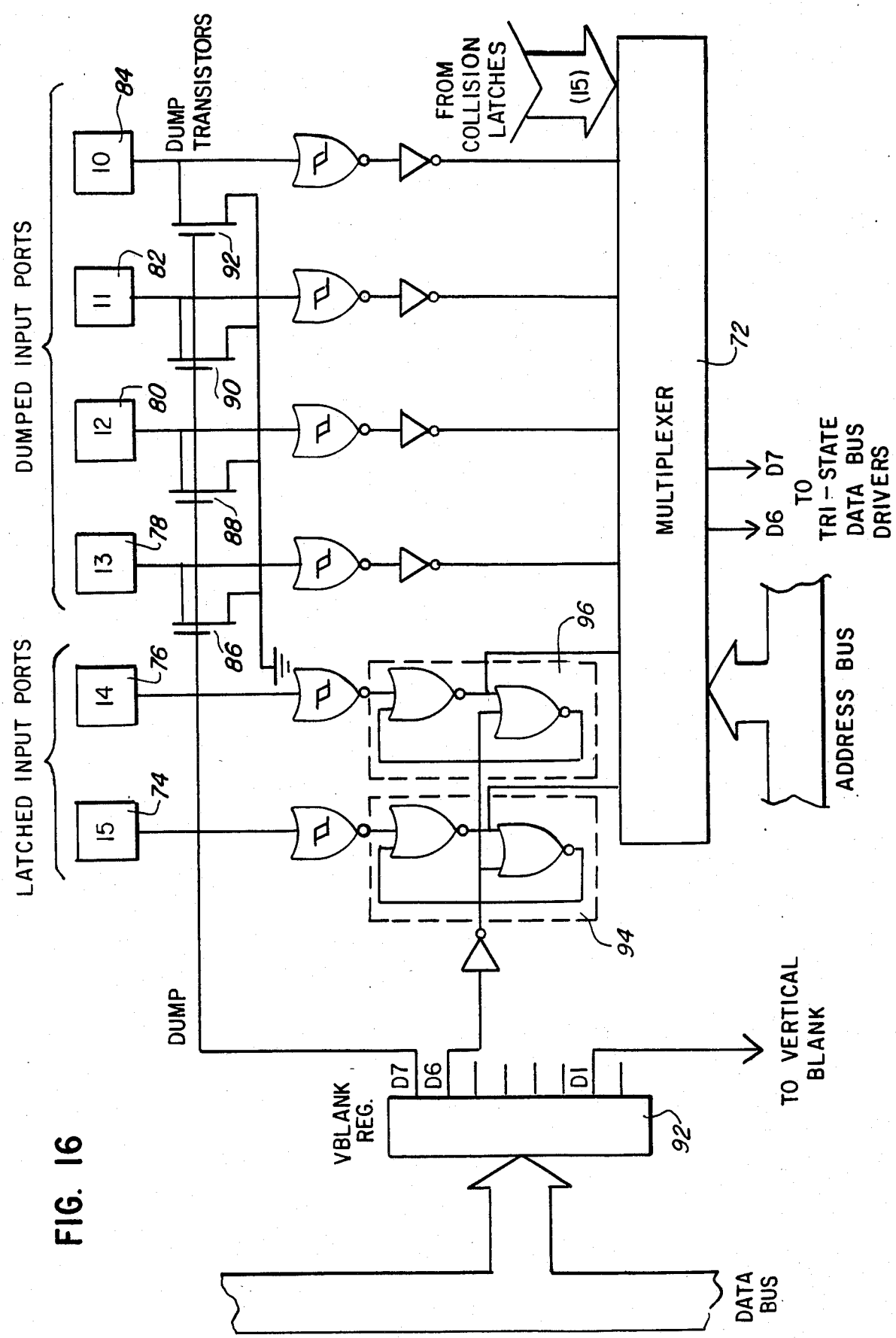
FIG. 16 is a more detailed diagram depicting the latched and dumped input ports of the TIA.

Shown in FIG. 16 are the six input ports 74 through 84 whose logic states can be read on data bit D7 by reading through a the multiplexor 72 the input port addresses INPT0 through INPT5 listed in the table of FIG. 4C. The six ports 74 through 84 are divided into two types, dumped 74, 76 and latched 78 through 84. The four dumped input ports 78 through 84 are normally used to read the operator controller 28, 30 positions from an external potentiometer/capacitor circuit (not shown). The output of the potentiometer is used to charge a capacitor in the console and when the capacitor is charged, the respective dumped input port goes high. The microprocessor 20 discharges this capacitor through the dump transistors 86 through 90 by writing a one to data bit D7 of the VBLANK register 92, then measures the time it takes to detect a logic one at that port. The charging time is used to position player graphics objects on the video display screen based on the position of the operator controller 28, 30. As long as data bit D7 of the VBLANK register is at logic zero, the four dumped ports 78 through 84 function as general purpose high input ports. When data bit D7 of the VBLANK register 92 is a logic one, the dumped ports 78 through 84 are grounded.

The two latched input ports 74, 76 have latches 94, 96 which can be enabled or disabled by writing to data bit D6 of the VBLANK register 92. When disabled, the latches 94, 96 are removed from the circuit completely and the ports 74, 76 become two general purpose input ports whose present logic state can be read directly by the microprocessor 20. When enabled, the latches 94, 96 will store zero logic level signals appearing on the two input ports 74, 76, and the input port addresses INPT4 and INPT5 will read the latches 94, 96 instead of the input ports 74, 76. When first enabled, the latches 94, 96 will remain positive as long as the input ports 74, 76 remain positive. A logic zero input port signal will clear a latch value to zero where it will remain until disabled. Both latches 94, 96 may be simultaneously disabled by writing a zero into data bit D6 of the VBLANK register 92.

Figure 17:
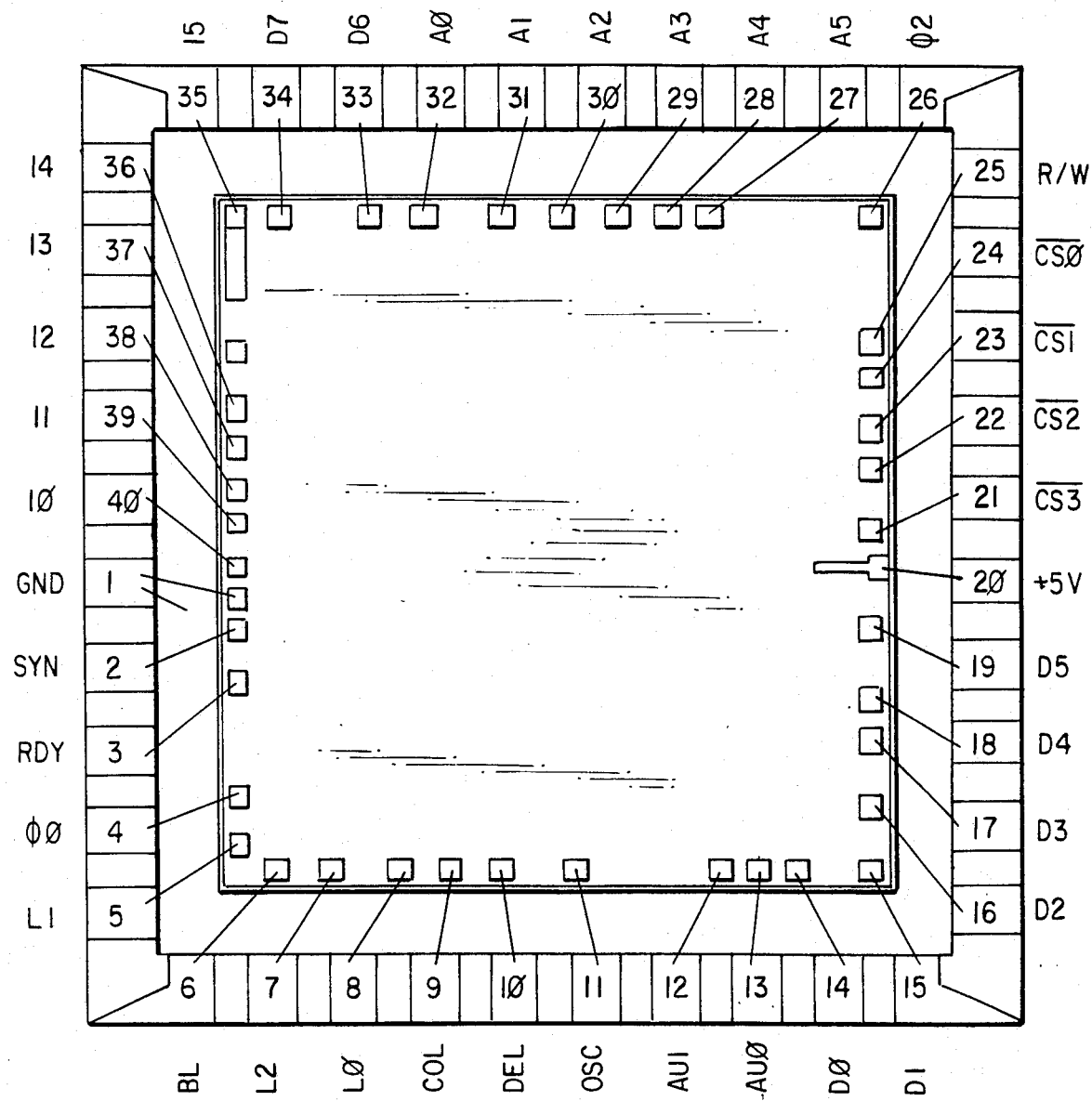
FIG. 17 is a bonding and pin diagram for the ceramic package of the TIA.

Shown in FIG. 17 is a priority encoder circuit 100. As discussed above in relation to collisions, simultaneous serial outputs from the graphics registers 54 represent overlap on a television screen. In order to have color luminosity values assigned to the individual graphics objects, it is necessary to establish overlap priorities between the graphics objects. The background graphics (BK) has the lowest priority and appears only when no objects are outputted. In order to simplify the logic involved, each missile graphics (M0,M1) is given the same color luminosity (color/lum) value and priority as its corresponding player graphics (P0,P1). Similarly, the ball graphics (BL) is given the same color/lum value and priority as the playfield graphics (PF). Highest priority is given to the Player Zero grahics (P0) and hence, also to the Missile Zero graphics (M0). Second highest priority is given to the Player One graphics (P1) and hence, also to the Missile One graphics (M1). Third highest priority is given to the playfield graphics (PF) and the ball graphics (BL). As mentioned above, lowest priority is given to the background graphics (BK). Graphics objects with higher priority will appear to move in front of graphics objects with lower priority.

The above priority assignment results in the player graphics and missile graphics moving in front of the playfield graphics. To make the player graphics (P0,P1) and missile graphics (M0,M1) move behind the playfield graphics (PF), a logic one must be written into data bit D2 of the CTRLPF register. As a result, the playfield graphics (PF) and ball graphics (BL) receive highest priority. A second priority control is available for displaying the score. When a one is written into data bit D1 of the CTRLPF register, the left half of the playfield takes on the color of Player Zero (P0) and the right half, the color of Player One (P1). The game score can then be displayed using the playfield graphics register 54, with the score being the same color as its associated player graphics (P0,P1).

FIG. 17 depicts the output pads and corresponding signals of the package for the Atari TIA integrated circuit 24.

With the above-detailed description of the TIA 24 as background, it is now possible to more fully understand the various aspects of the present invention, as discussed below.

THE INVENTIVE PROCESS

Figure 18:
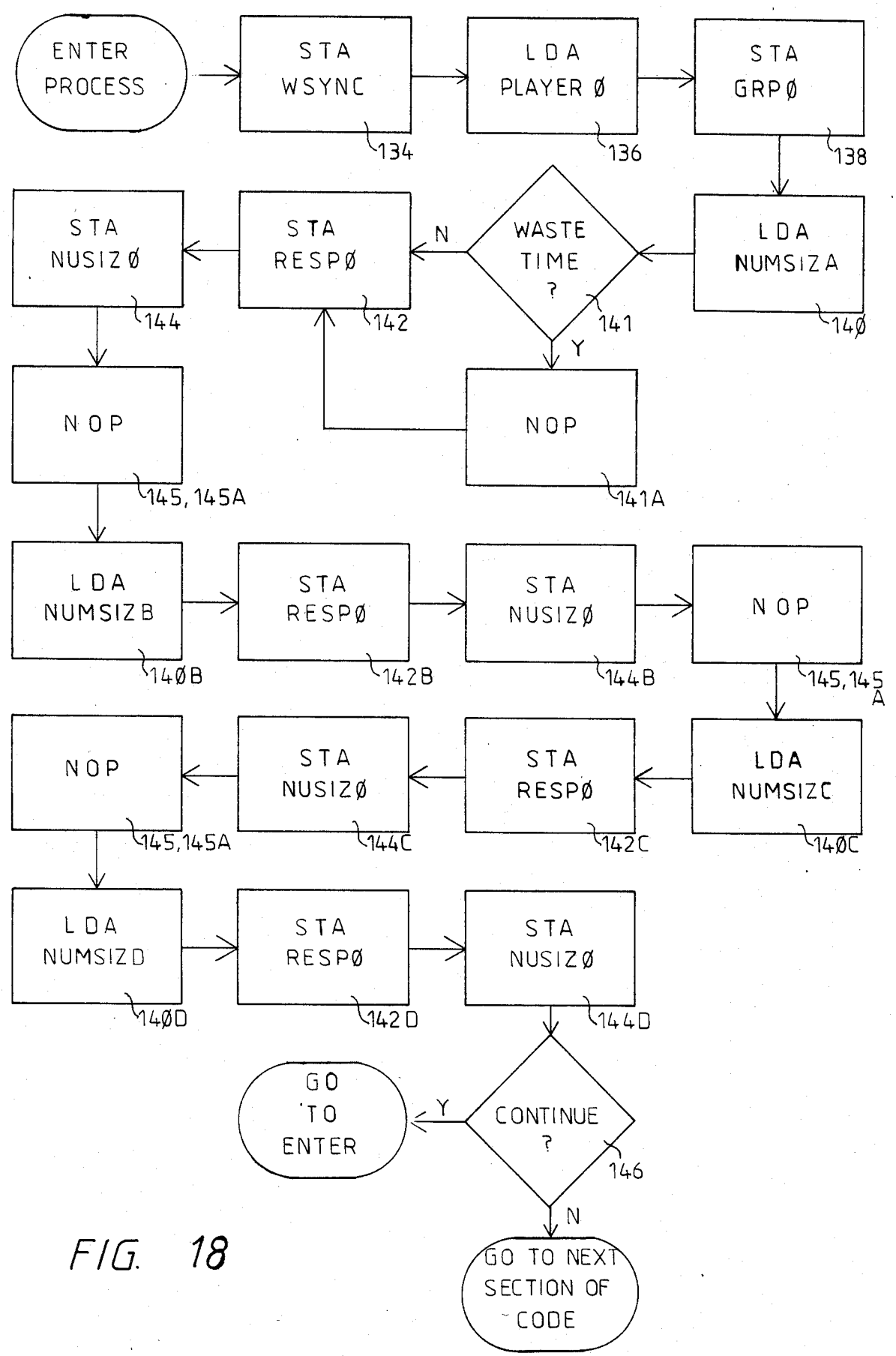
FIG. 18 is a block diagram of one aspect of the present inventive process for displaying objects on a video display screen.

Shown in FIG. 18 is a block diagram of one aspect of the inventive process. Generally, the process will be used when it is desired to display on a given series of horizontal scan lines greater than three high-resolution player graphics "copies," of one of the two available high-resolution player graphics "originals" (P0,P1). At the outset, it should be noted that the term "original" refers to the data stored in the player graphics register. As such, an "original" is not displayed on the video screen, but rather determines the type of graphics will be "copied" onto the display screen. As discussed above in reference to FIG. 2, unless the programmer uses all machine cycles on a horizontal scan line, the wait for sync (WSYNC) signal must be reset by the leading edge of a subsequent horizontal blank signal before the microprocessor 20 can begin its computations and register writing for a horizontal scan line. These various timing requirements, as discussed above, are referenced by block 134.

In accordance with a first aspect of the invention, a first set of data corresponding to the first high-resolution player graphics original is loaded at 136 into a CPU register such as, for example, the CPU accumulator. The data loaded into the CPU register at 136 is then stored at 138 into a Player Zero (GRP0) graphics register 54 in the TIA 24 corresponding to the first high-resolution player graphics original. A second set of data corresponding to the required number and spacing of the first high-resolution player graphics copies which are to be displayed on a given series of horizontal scan lines is then loaded at 140 into the CPU register. Subsequently, during the active portion of the horizontal scan lines, a reset address (RESP0) in the TIA 24 associated with the first high-resolution player graphics original is written to at 142. Immediately after writing at 142 to the reset address (RESP0) corresponding to the first high-resolution player graphics original, the data corresponding to the number and the spacing of the first player graphics copies to be displayed, which was stored at 140 to the CPU register, is stored at 144 into control register means (NUSIZ0) in the TIA 24 for controlling the number and spacing of the first high-resolution player graphics copies on a given series of horizontal scan lines.

If additional player graphics copies of the first high-resolution player graphics original are required to appear on the same series of horizontal scan lines of the video display screen, a new (or the same) set of data corresponding to the number and spacing of the additional high-resolution player graphics copies is loaded at 140B, into the CPU register. Thereafter, during the active portion of the horizontal scan line, the reset address (RESP0) in the TIA 24 corresponding to the first high-resolution player graphics original is again written to at 142, and the new data corresponding to number and spacing of the additional first high-resolution player graphics copies required to appear on the same series of horizontal scan lines of the video screen is subsequently stored at 144 to the control register means (NUSIZ0) in the TIA 24. The steps 142, 144 and 140 can be repeated in order, during the active portion of the horizontal scan lines, until the desired number of high-resolutiion player graphics copies corresponding to the first high-resolution player graphics original are made to appear on a given series of horizontal scan lines.

In accordance with the process shown in FIG. 18, it is possible to use the first high-resolution player graphics original in conjunction with combinations of multiple resets and subsequent stores to the control register means of variable sets of data to generate greater than three high-resolution copies on a given series of horizontal scan lines. The advantage of such a process is made more clear in reference also to FIG. 19. When only one of the two available high-resolution player graphics originals is used to create greater than three high-resolution player graphics copies on a given series of horizontal scan lines, the second high-resolution player grahics original capabilities can be used to generate other graphically different high-resolution copies on the same series of horizontal scan lines. Previously, if greater than three graphically similar high-resolution graphic copies were required to appear upon a single series of horizontal scan lines, both high-resolution player graphics originals had to be used, precluding the displaying of graphically different copies.

Figure 19:
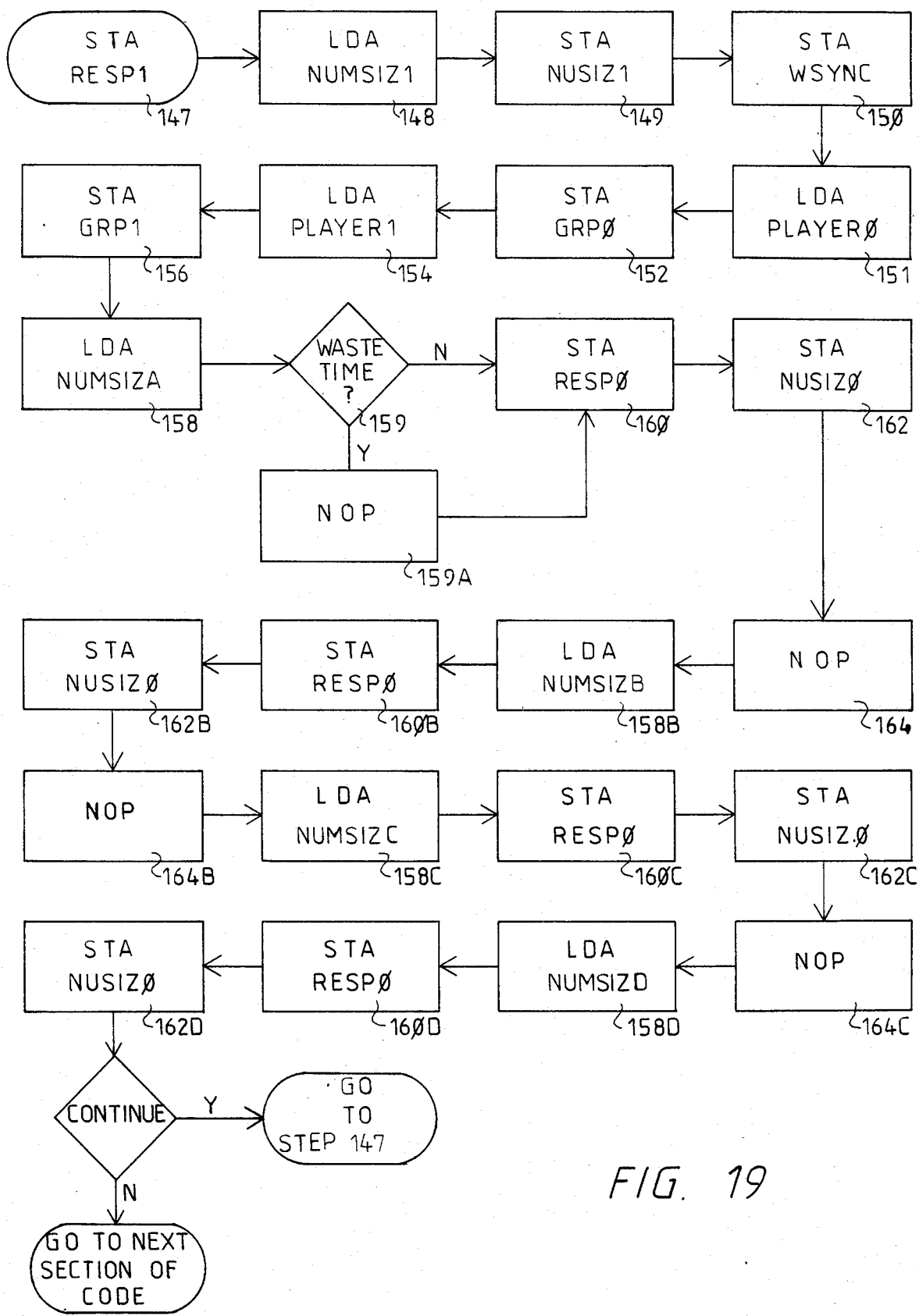
FIG. 19 is a modified block diagram of the inventive process shown above in FIG. 18.

Thus, referring to FIG. 19, before starting the active portion of a horizontal scan line by strobing, if necessary, the WSYNC address at 151, the reset address (RESP1) in the TIA 24 associated with the second high-resolution player graphics original is written to at 147. Next, the CPU register is loaded at 149 with data corresponding to the number and spacing of copies of the second high-resolution player graphics original which may be graphically different from the copies of the first high-resolution player graphics original and which are to be displayed on the same series of horizontal scan lines. The data corresponding to the number and spacing of the copies of the second high-resolution player graphics original is next stored at 149 into second control register means in the TIA 24 for controlling the number and spacing of the copies to be displayed. Then, after strobing the WSYNC address at 150 (if required), the CPU register is loaded at 151 with the first set of data corresponding to the first high-resolution player graphics original. The first set of data corresponding to the first high-resolution player graphics original is then stored at 152 into a player graphics register (GRP0) in the TIA 24 corresponding to the first high-resolution player graphics original. The CPU register is next loaded at 154 with a set of data corresponding to the second high-resolution player graphics original. The data corresponding to the second high-resolution player graphics original is then stored at 156 into a second player graphics register (GRP1) in the TIA 24 corresponding to the second high-resolution player graphics 20 original. The remainder of the process shown in FIG. 19 primarily corresponds to steps 140 through 146 shown in FIG. 18. A set of data corresponding to the number and spacing of the first high-resolution player graphics copies to be displayed on the series of horizontal scan lines is loaded at 158 into the CPU register. Then, during the active portion of the scan line, and after "wasting time" through NOP commands at 159 if required, the reset address (RESP0) in the TIA 24 associated with the first high-resolution player graphics original is then written to at 160. Subsequently, the set of data corresponding to the number and spacing of the first high-resolution player graphics copies is stored at 162 into control register means (NUSIZ0) in the TIA 24 for controlling the number and spacings of the first high-resolution player graphics copies.

If additional high-resolution player graphics copies corresponding to the first high-resolution player graphics original are required to appear on the same series of horizontal scan lines of video screen, appropriate 2-cycle NOP commands 164 are carried out to properly time the needed reset operations. Also, new data corresponding to the number and spacing of the required first high-resolution player graphics copies is again loaded at 158B into the CPU register. Then, at the machine cycle corresponding to the desired location on the scan line, writing at 160B to the reset address (RESP0) and subsequently storing at 162B into the control register means (NUSIZ0) the data corresponding to the number and spacing of the copies of the first high-resolution player graphics original results in the displaying of the additional high-resolution player graphics copies on the same given series of horizontal scan lines. The above process comprising steps 164 and 158B through 162B are carried out again at steps 164B and 158C through 164C, and at steps 164C and 158D through 162D. If at step 166 it is desired to continue the same process for additional scan lines, the program returns to strobe the WSYNC address at 150. Otherwise, the process is exited and the program continues with the next code section for more visible display graphics or in response to game-play or other ongoing activities.

In accordance with the process discussed in reference to FIG. 19, not only are greater than three high-resolution player graphics copies corresponding to the first high-resolution player graphics original selectively made to appear on a given series of horizontal scan lines, but also, additional high-resolution graphics copies corresponding to the second high-resolution player graphics original stored at 156 into the second player graphics register (GRP1) can be selectively positioned by appropriately timed reset and store operations along the same series of horizontal scan lines. If less than three copies of the second high-resolution player graphics original are required, a process in accordance with the prior art can be used with respect thereto. On the other hand, if greater than three copies are desired, the inventive process must also be used in conjunction with the second high-resolution player graphics original. Note that if less than five copies of one of the high-resolution player graphics originals are needed to be displayed on a given series of horizontal scan lines, it would not be necessary to reiterate the portion of the process of FIG. 19 comprising the NOP step 164, the subsequent loading step 158, storing step 160 and storing step 162 as shown. Depending on the number of copies required to be displayed on the given scan lines, the above steps may only need to be completed twice.

By altering at steps 146 and 166 the content of the data loaded into the control register means (NUSIZ0) corresponding to the number and spacing of the first high-resolution player graphics original, it is possible in combination with writing a plurality of times at steps 142 through 142D and 160 through 160D to the reset address (RESP0) corresponding to the first high-resolution player graphics original to selectively alter, during the active period of the horizontal scan lines, the number and spacing of high-resolution player graphics copies made to appear on any given series of horizontal scan lines. For example, on a first TV picture frame, it may be desirable to display on a given series of horizontal scan lines six high-resolution player graphics copies corresponding to the first high-resolution player graphics original. On the next TV frame, however, it may be that on the same series of horizontal scan lines one of the copies is required by game play activities to be removed. If such is the case, different data corresponding to the new number and spacing of the first high-resolution player graphics copies required to be displayed can be stored at steps 144 through 144D (if needed) and 162 through 162D (if needed) and combined with an appropriate number of resets at steps 142 through 142D (if needed), and stores to the control register means at 160 through 160D (if needed) to display, in this example, one less high-resolution player graphic copy than the previous TV frame.

In a video game, selectively altering the content of the set of data corresponding to the number and spacing of the first high-resolution player graphics copies to be displayed on a given series of horizontal scan lines comprises a number of steps. Initially, the game play activities occurring on the video display screen in response to operator inputs and commands from portions of the CPU and game cartridge must be continually monitored. In response to such game play, the number and spacing of first high-resolution player graphics copies required to appear on a given series of horizontal scan lines of the video display screen must be determined. Data corresponding to the determined number and spacing of the first high-resolution player graphics copies, is calculated and then stored into temporary memory means in the VCS. The CPU register can then be loaded with the calculated number and spacing data. After each writing operation to the reset address (RESP0) in the TIA 24, the number/spacing data can be stored to the control register means (NUSIZ0) in the TIA 24.

It was found that, when writing a plurality of times to a reset address (RESP0,RESP1) in the TIA 24 associated with a high-resolution player graphics original, the number and spacing of the high-resolution player graphics copies which appeared on a given series of horizontal scan lines did not correspond to the number and spacing as originally designed into the TIA 24 and shown in the prior art at FIG. 12 above. As a result, when determining the number and timing of resets of the reset address (RESP0,RESP1) required to be combined with appropriate data to be stored in the control register means (NUSIZ0,NUSIZ1) in order to correctly display the number of the high-resolution player graphics copies required to appear at the correct spacing on a given series of horizontal scan lines in response to the game-play activities, the fact that the first of the copies that normally appear is absent must be taken into consideration.

Figure 21:
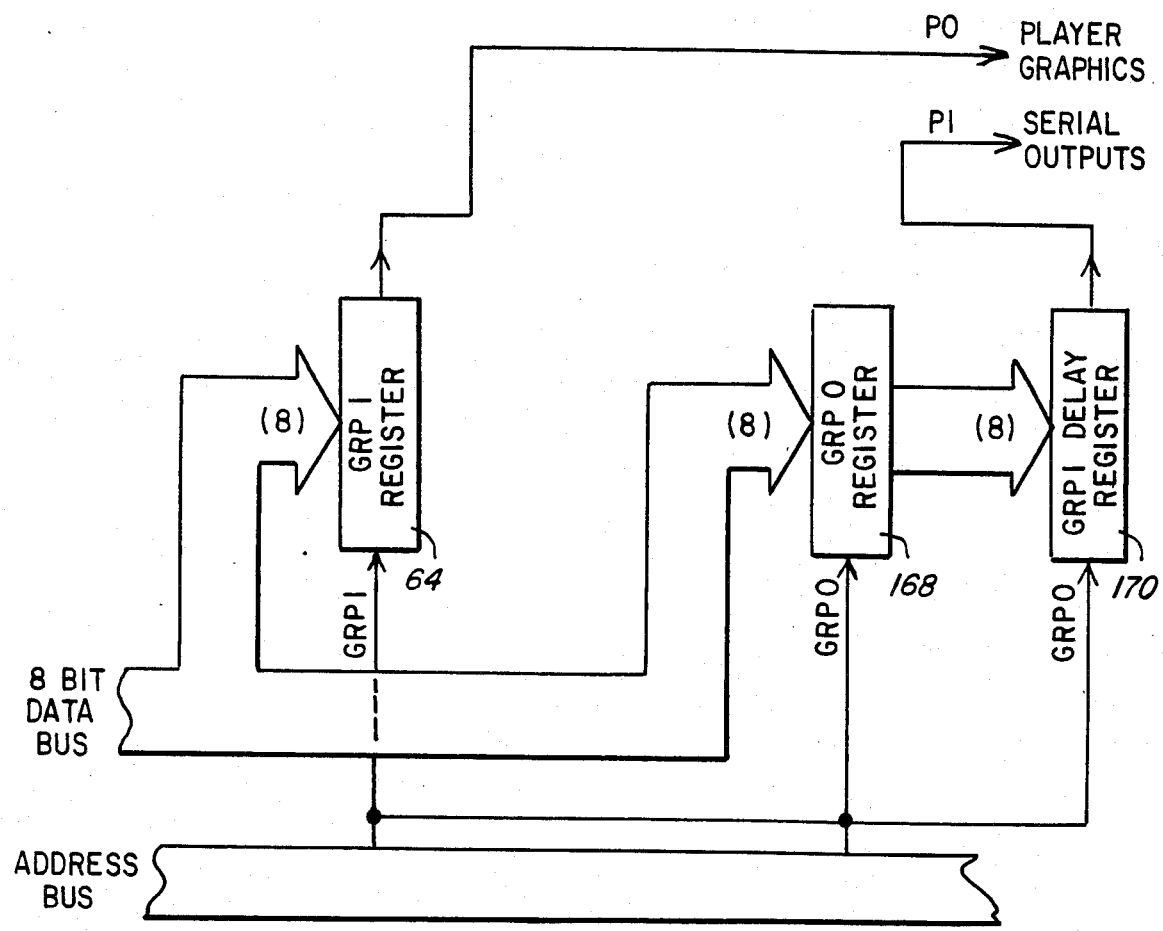
FIG. 21 is a block diagram of the vertical delay circuit shown above in FIG. 14 as modified in accordance with one aspect of the inventive process.

Shown in FIG. 20 is a more detailed block diagram algorithm of the present invention which may selectively incorporate a modified vertical delay circuit shown in FIG. 21. As discussed above in reference to FIG. 14, normally, in accordance with the prior art, the TIA 24 operated on a two-line resolution basis, and incorporated the vertical delay circuit of FIG. 14 to effectively achieve single-line resolution. With effective programming techniques, it is now possible to operate in accordance with the present process without using any vertical delay circuitry. However, if additional programming is to be achieved by the microprocessor 20 during its allotted run time on a scan line, it may be necessary to use the modified vertical delay circuitry shown in FIG. 21. In particular, when the second high-resolution player graphics original is utilized, it may be necessary to shift at step 200 in FIG. 20 data preloaded into the first player graphics register 168 (GRP0) to a delay register 170 (GRP0 delay). Usually, the vertical delay circuitry is not needed and the first high-resolution player graphics original (P0) and the second high-resolution player graphics original (P1) can have the required data written into the associated player graphics registers (GRP0,GRP1) during one horizontal scan line.

Figure 22:
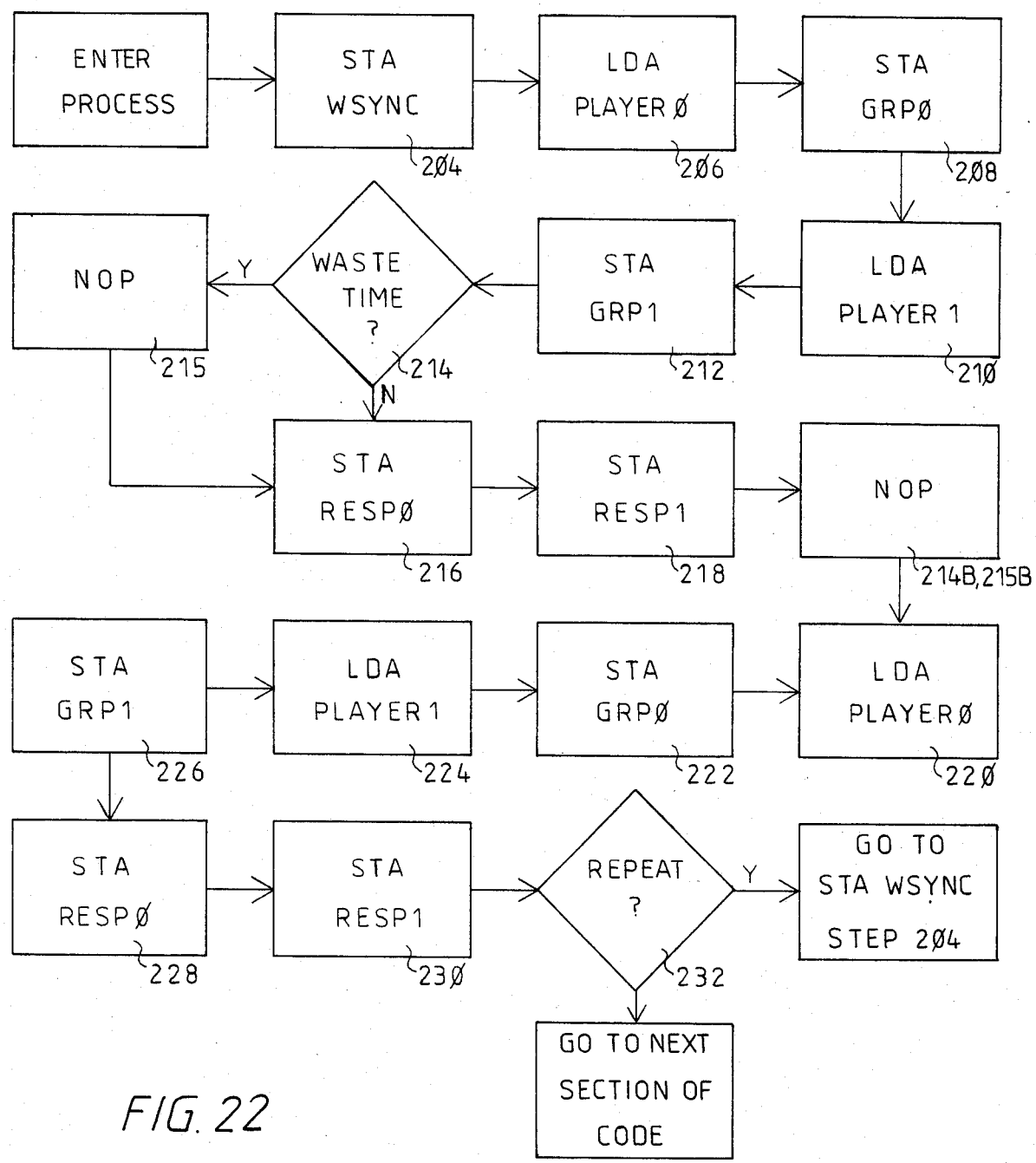
FIG. 22 is a block diagram of another embodiment of the inventive process for displaying objects on a video display screen.

In order to assure that the reset address (RESP0,RESP1) in the TIA 24 associated with the appropriate high-resolution player graphics original is written to at proper machine cycle locations along the active portion of the active portion of the horizontal scan line, it may be necessary, as shown at steps 141, 141A and 145, 145A of FIG. 18, at steps 159, 159A and 164 through 164D (if needed) of FIG. 19, and at steps 214, 215 and 214B, 215B of FIG. 22 to essentially "waste time" through no-operation (NOP) commands. Thus, after the appropriate number and spacing of the high-resolution layer graphics copies data required to appear on the next horizontal scan line has been calculated in response to game-play activities, the appropriate software program stored in memory means in the game-play cartridge to achieve the determined number and spacing of the first high-resolution layer graphics will automatically execute the NOP commands as required.

Referring now to FIG. 22, a second embodiment of the present invention provides a means for displaying greater than two separate and graphically different high-resolution layer graphics copies on a given series of horizontal scan lines of video display screen. In the prior art, there was no means provided for selectively displaying along any portion of the active scan line greater than two graphically different copies of player graphics originals. At best, it was possible to alter, between the copies displayed in response to the number/spacing register (NUSIZE), the content of data in the player grphics registers of each player graphics original, to display up to six graphically different copies. However, greater than two graphically different copies were not able to be displayed at variable spacings along the entire range of the active portion of the scan line. Accordingly, the variations in the "type" of graphics displayed in the prior art was quite limited. With the present invention, however, it is possible to utilize the two provided high-resolution player graphics originals (P0,P1), in combination with multiple resets and access to selectively different sets of data corresponding to the player graphics originals to be stored into the player graphics registers (GRP0,GRP1), to display at least three individually controllable and graphically different high-resolution player graphic copies on a given series of horizontal scan lines. Such a process is especially useful when displaying and updating essential game data such as the number of plays remaining for a video game and the number or screen level currently appearing on the video display screen.

In accordance with this embodiment of the process, and referring to FIG. 22, the WSYNC address is strobed at 204 and data corresponding to a first high-resolution player graphics original is loaded at 206 into the CPU register. The first set of data corresponding to the first high-resolution player graphics original is then stored at 208 to the first player graphics register (GRP0) in the TIA 24. A second set of data corresponding to the second high-resolution player graphics original is loaded at 210 into the CPU register. The second set of data corresponding to the second high-resolution player graphics original is then stored at 212 to the second player graphics register (GRP1) in the TIA 24. At this point in the process, the required data to cause the first two different high-resolution player graphics copies to appear on a given series of horizontal scan lines at the video display screen have been loaded to the corresponding first and second player graphics registers (GRP0,GRP1). If the copies are not required to be displayed until partially into the active portion of the scan lines, it is necessary to determine at 214 and execute at 215 the required number of NOP, or equivalent "time wasting," commands. After executing all required NOP commands, writing at 216, 218 to the particular reset addresses (RESP0,RESP1) in the TIA 24 during the active portion of the scan line causes two graphically different high-resolution player graphics copies to appear sequentially on the same series of horizontal scan lines.

If it is desired to display a second set of graphically different high-resolution player graphics copies farther along the active portion of the same horizontal scan line of the video display screen, it may be necessary to again execute NOP commands 215B as determined at 214B. After executing the required NOP commands, a set of data corresponding to a graphically different third high-resolution player graphics original is loaded at 220 into the CPU register. The loaded data is then stored at 222 to the first high-resolution player graphics register (GRP0) in the TIA 24. If a copy of a fourth graphically different high-resolution player graphics original is desired, a fourth set of data corresponding to a fourth high-resolution player graphics original is loaded at 224 into the CPU register and subsequently stored at 226 to the appropriate player graphics register (GRP2) in the TIA 24. Consecutive reset operations at 228 and 230 cause the display of the third and fourth copies of the graphically different first and second high-resolution player graphics, which in turn may be graphically different from the copies displayed earlier on the same scan lines. Such a process can be repeated as determined at 232 until the required number of graphically different high-resolution player graphics copies have been displayed on the same series of horizontal scan lines of the video display screen. Of course, if only three different high-resolution player graphics copies are required to be displayed on the same scan lines, the fourth set of data need not be loaded at 224 into the CPU register and the subsequent storing 226 and reset 230 operations become unnecessary.

Listed in the table of FIG. 23 is a section of the assembler code corresponding primarily to the embodiment of the process discussed above in reference to FIG. 19. Listed with each code instruction is the machine cycle upon which the instruction ends and a brief description of the function of each instruction. The machine cycles are counted after resetting WSYNC, and hence, correspond to the machine cycles during the active portion of the scan line. The purpose of FIG. 23 is to more graphically portray the timing requirements and constraints of the process. For example, note that the NOP instructions listed in the table of FIG. 23 do not occur at precisely the same locations as shown in the algorithm of FIG. 19. The NOP instructions have no effect on the process other than to aid in the timing of the reset operations.

It will be understood that the inventive process may be embodied in other specific forms without departing from the spirit and scope thereof. The present inventions are to be considered as being illustrative and not as being restrictive, and the invention is not to be limited to the details herein but may be modified within the scope of the appended claims.

What is claimed is:

1. A process for displaying a plurality of objects, used in conjunction with a video computer system (VCS) having a central processing unit (CPU) and a television interface adapter (TIA), comprising the steps of
   (a) storing a set of data corresponding to a first high-resolution player graphics original image into first player graphics register means in the TIA;
   (b) writing to reset address means in the TIA corresponding to the first high-resolution player graphics original image;
   (c) storing into first control register means in the TIA data corresponding to the number of copies of said first high-resolution player graphics original image which is to appear along a series of horizontal scan lines, and storing data corresponding to the horizontal spacing between each of said copies; and
   (d) repeating steps (b) and (c) at least once during the active portion of the horizontal scan line to display greater than three copies of the first high-resolution player graphics original image on a given series of horizontal scan lines.

2. The process of claim 1, further comprising the steps of:
   (a) writing to reset address means in the TIA corresponding to a second high-resolution player graphics original image;
   (b) storing into second control register means in the TIA data corresponding to the number of copies and the spacing between each copy of the second high-resolution player graphics original image which are to appear along a series of horizontal scan lines; and
   (c) storing a set of data corresponding to the second high-resolution player graphics original image into second player graphics register means in the TIA so that copies corresponding to the second high-resolution player graphics original image can be displayed on the same scan lines as the copies of the first high-resolution player graphics original image.

3. The process of claim 1 further comprising the step of loading the set of data corresponding to the first high-resolution player graphics original image into register means in the CPU before storing the same data to the player graphics register means in the TIA.

4. The process of claim 1 further comprising the step of loading the set of data corresponding to the number and spacing of copies of the first high-resolution player graphics original image into register means in the CPU before storing the same data to the control register means in the TIA.

5. The process of claim 1 further comprising the step of selectively altering the timing of the step of writing during the active portion of the horizontal scan line to the reset address corresponding to the first high-resolution player graphics original image to cause the displayed copies of the first high-resolution player graphics original image to appear to move horizontally along the given scan lines in a subsequent video display frame.

6. The process of claim 1 wherein step (c) further comprises the step of altering the content of the set of data corresponding to the number and spacing of copies of the first high-resolution player graphics original before storing the set of data into the control register means in the TIA.

7. A process for displaying a plurality of objects on a video display screen, used in conjunction with a video computer system (VCS) having a central processing unit (CPU), a television interface adapter (TIA) with at least first and second high-resolution player graphics original images, and the inherent capability to generate up to three high-resolution player graphics copies for each original image, and a video game-play program consisting of digital data stored in memory means, the video game-play program including in part the process of:
   (a) determining in accordance with game-play objectives possible combinations of the number and spacing of high-resolution player graphics copies which may be required to appear along a given series of horizontal scan lines of the video display screen;
   (b) determining the number of write operations to reset address means in the TIA required to be combined with data stored in control register means in the TIA for controlling the number and spacing of the high-resolution player graphics copies in order to display each of the combinations determined in step (a) above;
   (c) pre-storing into the memory means of the game-play program for each of the combinations determined at step (a) data corresponding to (i) the required number of write operations to the reset address in the TIA, and (ii) the required data to be stored in the control register means in the TIA after each reset;

(d) monitoring ongoing game-play activities to identify the required number and spacing of the first high-resolution player graphic copies to be displayed on a given series of horizontal scan lines;

(e) storing data corresponding to the first high-resolution player graphics original into first player graphics register means in the TIA; and (f) repeating in accordance with the number of resets in the pre-stored data of step (c) the steps of (i) resetting the reset address in the TIA and (ii) storing in the control register means in the TIA the portion of the pre-stored data corresponding to the number and spacing of the first high-resolution player graphics copies required to be displayed on the given series of horizontal scan lines.

8. The process of claim 7, further comprising the step of storing data corresponding to a second high-resolution player graphics original image into a second player graphics register means in the TIA.

9. The process of claim 7, further comprising the step of selectively altering the timing of the write operation to the reset address in subsequent frames of the video display to cause the position of the displayed first high-resolution player graphics copies to appear to move horizontally along the scan lines.

* * * * *